(12) United States Patent
Li et al.

(10) Patent No.: US 10,963,830 B2
(45) Date of Patent: Mar. 30, 2021

(54) SYSTEMS AND METHODS FOR DETERMINING AN OPTIMAL STRATEGY

(71) Applicant: BEIJING DIDI INFINITY TECHNOLOGY AND DEVELOPMENT CO., LTD., Beijing (CN)

(72) Inventors: Sixu Li, Beijing (CN); Pei Li, Beijing (CN); Fan Yang, Beijing (CN); Lei Hu, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 188 days.

(21) Appl. No.: 16/232,042

(22) Filed: Dec. 25, 2018

(65) Prior Publication Data
US 2019/0130333 A1 May 2, 2019

Related U.S. Application Data

(63) Continuation of application No. PCT/CN2018/096509, filed on Jul. 20, 2018.

(30) Foreign Application Priority Data

Jul. 25, 2017 (CN) .......................... 201710613409.4
Jul. 26, 2017 (CN) .......................... 201710618381.3

(51) Int. Cl.
*G06Q 10/06* (2012.01)
*G06Q 30/02* (2012.01)
(Continued)

(52) U.S. Cl.
CPC ..... *G06Q 10/06375* (2013.01); *G06F 16/285* (2019.01); *G06Q 10/04* (2013.01);
(Continued)

(58) Field of Classification Search
CPC ........................................ G06Q 10/00–50/00
(Continued)

(56) References Cited

U.S. PATENT DOCUMENTS 6,321,206 B1 * 11/2001 Honarvar ............... G06Q 10/06
705/7.33
7,975,000 B2 * 7/2011 Dixon ................ G06Q 30/0254
709/203
(Continued)

FOREIGN PATENT DOCUMENTS

CA      2923979 A1    3/2014
CN      102149119 A   6/2011
(Continued)

OTHER PUBLICATIONS

Chowdhury, Md Maruf Hossan, and Mohammed A. Quaddus. "A multiple objective optimization based QFD approach for efficient resilient strategies to mitigate supply chain vulnerabilities: The case of garment industry of Bangladesh." Omega 57 (2015): 5-21. Year: 2015).*
(Continued)

*Primary Examiner* — Alan S Miller
(74) *Attorney, Agent, or Firm* — Metis IP LLC

(57) ABSTRACT

The present disclosure is related to systems and methods for determining an optimal strategy. The method includes classify one or more users into a first user group and a second user group using an optimization model, wherein the first user group and the second user group correspond to two strategies, respectively. The method also includes obtain behavior data from terminals of the one or more users in the first user group and the second user group. The method further includes determine a first value of a parameter regarding the first user group and a second value of the parameter regarding the second user group using the opti-
(Continued)

mization model. The method further includes determine a strategy based on the first value and the second value.

18 Claims, 13 Drawing Sheets

(51) Int. Cl.
*G06Q 10/04* (2012.01)
*G06F 16/28* (2019.01)
(52) U.S. Cl.
CPC ....... *G06Q 10/067* (2013.01); *G06Q 30/0206* (2013.01); *G06Q 30/0242* (2013.01); *G06Q 30/0243* (2013.01); *G06Q 30/0244* (2013.01)
(58) Field of Classification Search
USPC .............................................. 705/7.11–7.42
See application file for complete search history.

(56) References Cited

U.S. PATENT DOCUMENTS

| | | | | |
|---|---|---|---|---|
| 7,991,800 | B2* | 8/2011 | Lawrence | G06Q 30/0204 707/803 |
| 8,019,049 | B2* | 9/2011 | Allen, Jr. | H04M 3/28 379/10.01 |
| 8,583,766 | B2* | 11/2013 | Dixon | H04L 67/42 709/219 |
| 8,744,890 | B1* | 6/2014 | Bernier | G06Q 10/06316 705/7.16 |
| 9,098,810 | B1* | 8/2015 | Sengupta | G06Q 10/0637 |
| 9,135,286 | B2* | 9/2015 | Sengupta | G06Q 10/06 |
| 9,916,538 | B2* | 3/2018 | Zadeh | G06K 9/627 |
| 10,169,779 | B2* | 1/2019 | Vohra | G06Q 30/0269 |
| 2006/0162071 | A1* | 7/2006 | Dixon | G06Q 30/02 5/93.1 |
| 2008/0027788 | A1* | 1/2008 | Lawrence | G06Q 30/0204 705/7.33 |
| 2008/0047018 | A1 | 2/2008 | Baudoin | |
| 2010/0114554 | A1 | 5/2010 | Misra | |
| 2011/0225265 | A1* | 9/2011 | Dixon | G06Q 30/0242 709/217 |
| 2011/0295722 | A1* | 12/2011 | Reisman | G06Q 30/0641 705/27.1 |
| 2013/0086237 | A1 | 4/2013 | Cutler et al. | |
| 2013/0191455 | A1* | 7/2013 | Penumaka | H04L 67/22 709/204 |
| 2014/0149183 | A1 | 5/2014 | Liu et al. | |
| 2014/0379488 | A1 | 12/2014 | Tashiro et al. | |
| 2015/0178367 | A1* | 6/2015 | Kumar Doddavula | G06F 16/254 707/602 |
| 2015/0205827 | A1* | 7/2015 | Sengupta | G06Q 10/0637 707/690 |
| 2015/0220577 | A1* | 8/2015 | Sengupta | G06F 16/22 707/758 |
| 2016/0125456 | A1* | 5/2016 | Wu | G06Q 30/0251 705/14.49 |
| 2016/0253683 | A1 | 9/2016 | Gui et al. | |
| 2017/0052652 | A1* | 2/2017 | Denton | G06F 16/248 |
| 2017/0103133 | A1 | 4/2017 | Xiong et al. | |
| 2017/0103194 | A1* | 4/2017 | Wechsler | G06F 21/316 |
| 2018/0004826 | A1* | 1/2018 | Reiner | G06F 16/28 |
| 2018/0101877 | A1 | 4/2018 | Song et al. | |
| 2018/0314621 | A1* | 11/2018 | Ditullio | G06F 8/72 |

FOREIGN PATENT DOCUMENTS

| | | |
|---|---|---|
| CN | 102194164 A | 9/2011 |
| CN | 102307205 A | 1/2012 |
| CN | 10395712 A | 5/2013 |
| CN | 103246597 A | 8/2013 |
| CN | 105763476 A | 7/2016 |
| CN | 106339897 A | 1/2017 |
| CN | 106779318 A | 5/2017 |
| JP | 2016071481 A | 5/2016 |

OTHER PUBLICATIONS

Chen, Chen-Yuan, et al. "The exploration of internet marketing strategy by search engine optimization: A critical review and comparison." African Journal of Business Management 5.12 (2011): 4644-4649. (Year: 2011).*
International Search Report for PCT/CN2018/096509 dated Sep. 25, 3018, 4 pages.
Written Opinion for PCT/CN2018/096509 dated Sep. 25, 2018, 4 pages.
First Office Action in Chinese Application No. 20170618381.3 dated Jun. 2, 2020, 21 pages.
The Second Office Action in Chinese Application No. 201710613409.4 dated Apr. 27, 2020, 12 pages.
Notice of Rejection in Japanese Application No. 2018-567142 dated Apr. 21, 2020, 16 pages.
APPADHOC, A/B Testing Algorithm Secrets Part Four: How did the confidence interval come from, http://www.woshipm.com/pnd/ 388782.html, 2016, 6 pages.
APPADHOC, A/B Testing Algorithm Secrets Part Three: How to Analyze Test Data (Part 2), http://www.woshipm.com/operate/ 385200.html, 2016, 7 pages.
First Office Action in Chinese Application No. 201710613409.4 dated Dec. 18, 2019, 13 pages.
Examination Report in Canadian Application No. 3028291 dated Feb. 7, 2020, 9 pages.
Office Action in Canadian Application No. 3028291 dated Aug. 3, 2020, 8 pages.
Office Action in India Application No. 201617048691 dated Aug. 5, 2020, 7 pages.

* cited by examiner

SYSTEMS AND METHODS FOR DETERMINING AN OPTIMAL STRATEGY

CROSS-REFERENCE TO RELATED APPLICATION

This application is a continuation of International Application No. PCT/CN2018/096509, filed on Jul. 20, 2018, which further claims priority to Chinese Patent Application No. 201710613409.4, filed on Jul. 25, 2017, and Chinese Patent Application No. 201710618381.3, filed on Jul. 26, 2017. Each of the above-referenced applications is expressly incorporated herein by reference in their entireties.

TECHNICAL FIELD

This disclosure generally relates to computer based data management system, and more particularly, relates to systems and methods for determining an optimal strategy in a strategy evaluation system.

BACKGROUND

Strategy evaluation systems are widely used in various fields, such as online to offline services (e.g., a taxi service, a delivery service, an online shopping service), product research and development (R&D), advertisement, etc. Among them, A/B testing, is frequently used in the strategy evaluation systems, to evaluate performances of two strategies based on users' behavior data (e.g., user acceptances), and determine an optimal strategy. This patent application provides systems and methods to modify an NB test model in order to effectively improve the accuracy of the business strategy assessment. In addition, the A/B testing used herein, instead of one dimension, may be in multiple dimensions (e.g., age, gender, or education background), and thereby, providing more comprehensive users' feedback analysis and a more reliable optimal strategy.

SUMMARY

According to an aspect of the present disclosure, a system for determining an optimal strategy is provided. The system may include at least one storage medium storing a set of instructions and at least one processor configured to communicate with the at least one storage medium. When executing the set of instructions, the at least one processor is directed to perform one or more of the following operations, for example, classify one or more users into a first user group and a second user group using an optimization model, wherein the first user group and the second user group correspond to two strategies, respectively; obtain behavior data from terminals of the one or more users in the first user group and the second user group; determine, based on the behavior data of the one or more users, a first value of a parameter regarding the first user group and a second value of the parameter regarding the second user group using the optimization model; and determine an optimal strategy based on the first value and the second value.

In some embodiments, the at least one processor may be further directed to initiate the optimization model to classify the one or more users into the first user group and the second user group when the system obtains service requests from the one or more users.

In some embodiments, to classify the one or more users into the first user group and the second user group, the at least one processor may be directed to generate a random number for each of the one or more users; determine whether the random number for each of the one or more users is greater than a threshold; in response to the random number for a user being greater than the threshold, classify the user into the first user group.

In some embodiments, in response to the random number for a user being not greater than the threshold, the at least one processor may be further directed to classify the user into the second user group.

In some embodiments, the parameter may include a parameter in multiple dimensions.

In some embodiments, the parameter in multiple dimensions may relate to order information of on-demand services.

In some embodiments, the multiple dimensions may include a gender, a city, and/or an operation system of the terminal of the one or more users.

In some embodiments, to obtain behavior data from the terminals of the one or more users in the first user group and the second user group, the at least one processor may be directed to obtain user logs including the behavior data from terminals of the one or more users using a Hadoop Distribute File System.

In some embodiments, the at least one processor may be further directed to determine a parameter difference of the parameter regarding the first user group and the second user group; determine a reliability level of the parameter difference; and adjust the optimization model based on the parameter difference and the reliability level of the parameter difference.

In some embodiments, to determine the parameter difference of the parameter regarding the first user group and the second user group, the at least one processor may be directed to determine a first difference value of the parameter regarding the first user group and the second user group.

In some embodiments, to determine the first difference value of the parameter regarding the first user group and the second user group, the at least one processor may be directed to determine a second difference value; determine a third difference value; and determine the first difference value based on the second difference value and the third difference value.

In some embodiments, to determine the second difference value, the at least one processor may be directed to obtain behavior data of the one or more users associated with one of the two strategies; determine, based on the behavior data of the one or more users associated with the one of the two strategies, a third value of the parameter regarding the first user group and a fourth value of the parameter regarding the second user group using the a correction model; and determine the second difference value based on the third value and the fourth value.

In some embodiments, to determine the third difference value, the at least one processor may be directed to determine the third difference value based on the first value and the second value.

In some embodiments, to determine the reliability level of the parameter difference, the at least one processor may be directed to determine, at a preset confidence coefficient, a confidence interval of the first difference value.

In some embodiments, to determine the reliability level of the parameter difference, the at least one processor may be directed to determine a P value based on the first difference value; compare the P value with a significance value; and determine the reliability level of the parameter difference based on the comparison of the P value with the significance value.

According to an aspect of the present disclosure, a system for determining an optimal strategy is provided. The system may include at least one storage medium storing a set of instructions and at least one processor configured to communicate with the at least one storage medium. When executing the set of instructions, the at least one processor is directed to perform one or more of the following operations, for example, classify one or more users into a first user group and a second user group using an optimization model, wherein the first user group and the second user group correspond to two strategies, respectively; obtain behavior data from terminals of the one or more users in the first user group and the second user group; determine, based on the behavior data of the one or more users, a first value of a parameter in multiple dimension regarding the first user group and a second value of the parameter in multiple dimension regarding the second user group using the optimization model; and determine an optimal strategy based on the first value and the second value.

According to another aspect of the present disclosure, a method for determining an optimal strategy may be determined. The method may be implemented on a computing device having at least one processor and at least one computer-readable storage medium. The method may include, for example, classifying one or more users into a first user group and a second user group using an optimization model, wherein the first user group and the second user group correspond to two strategies, respectively; obtaining behavior data from terminals of the one or more users in the first user group and the second user group; determining, based on the behavior data of the one or more users, a first value of a parameter regarding the first user group and a second value of the parameter regarding the second user group using the optimization model; and determining an optimal strategy based on the first value and the second value.

According to another aspect of the present disclosure, a method for determining an optimal strategy may be determined. The method may be implemented on a computing device having at least one processor and at least one computer-readable storage medium. The method may include, for example, obtaining behavior data from terminals of the one or more users in the first user group and the second user group; determining, based on the behavior data of the one or more users, a first value of a parameter in multiple dimension regarding the first user group and a second value of the parameter in multiple dimension regarding the second user group using the optimization model; and determining an optimal strategy based on the first value and the second value.

According to still another aspect of the present disclosure, a non-transitory computer readable medium is provided. The non-transitory computer readable medium may include at least one set of instructions for determining an optimal strategy, wherein when executed by at least one processor of a computer device, the at least one set of instructions causes the computing device to perform a method. The method may include, for example, obtaining behavior data from terminals of the one or more users in the first user group and the second user group; determining, based on the behavior data of the one or more users, a first value of a parameter in multiple dimension regarding the first user group and a second value of the parameter in multiple dimension regarding the second user group using the optimization model; and determining an optimal strategy based on the first value and the second value.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
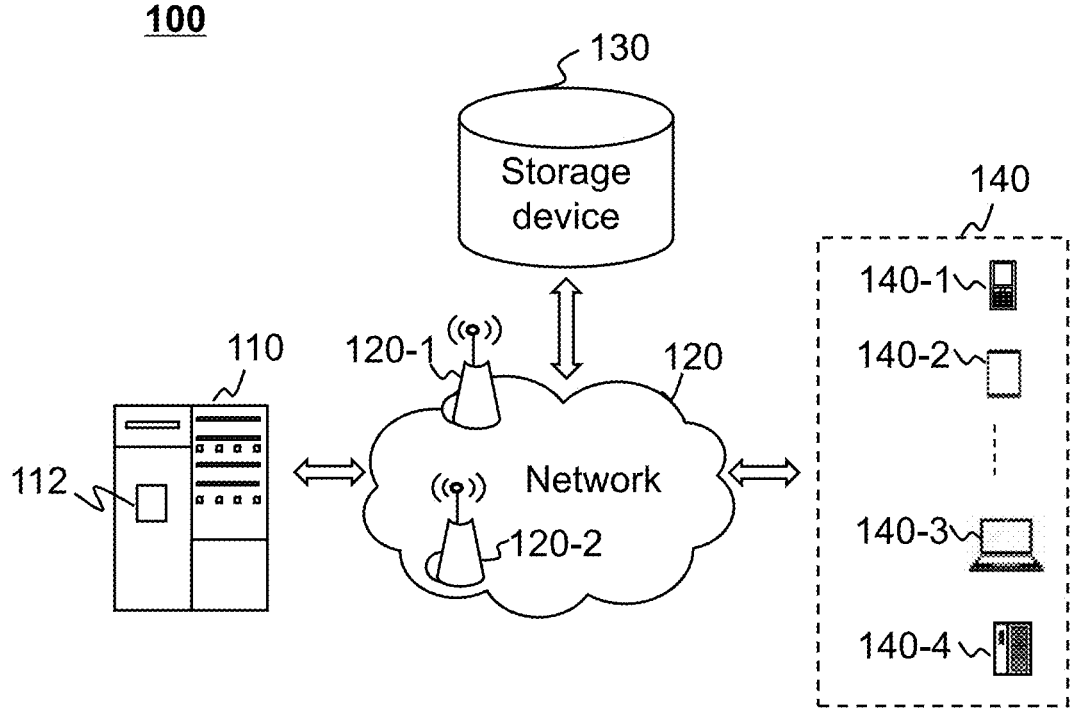
FIG. 1 is a schematic diagram illustrating an exemplary strategy evaluation system according to some embodiments of the present disclosure.

In order to illustrate the technical solutions related to the embodiments of the present disclosure, brief introduction of the drawings referred to in the description of the embodiments is provided below. Obviously, drawings described below are only some examples or embodiments of the present disclosure. Those having ordinary skills in the art, without further creative efforts, may apply the present disclosure to other similar scenarios according to these drawings. Unless stated otherwise or obvious from the context, the same reference numeral in the drawings refers to the same structure and operation.

As used in the disclosure and the appended claims, the singular forms "a," "an," and "the" include plural referents unless the content clearly dictates otherwise. It will be further understood that the terms "comprises," "comprising," "includes," and/or "including" when used in the disclosure, specify the presence of stated steps and elements, but do not preclude the presence or addition of one or more other steps and elements.

Some modules of the system may be referred to in various ways according to some embodiments of the present disclosure, however, any number of different modules may be used and operated in a client terminal and/or a server. These modules are intended to be illustrative, not intended to limit the scope of the present disclosure. Different modules may be used in different aspects of the system and method.

According to some embodiments of the present disclosure, flow charts are used to illustrate the operations performed by the system. It is to be expressly understood, the operations above or below may or may not be implemented in order. Conversely, the operations may be performed in inverted order, or simultaneously. Besides, one or more other operations may be added to the flowcharts, or one or more operations may be omitted from the flowchart.

Technical solutions of the embodiments of the present disclosure be described with reference to the drawings as described below. It is obvious that the described embodiments are not exhaustive and are not limiting. Other embodiments obtained, based on the embodiments set forth in the present disclosure, by those with ordinary skill in the art without any creative works are within the scope of the present disclosure.

An aspect of the present disclosure is directed to systems and methods for determining an optimal strategy. The systems and methods may classify one or more users into a first user group and a second user group using an optimization model. The first user group and the second user group may correspond to two strategies, respectively. The systems and methods may also obtain behavior data from terminals of the one or more users associated with the two strategies. The systems and methods may further determine, based on the behavior data of the one or more users, a first value of a parameter regarding the first user group and a second value of the parameter regarding the second user group using the optimization model. Accordingly, the systems and methods may select a user group from the first user group and the second user group based on the first value and the second value and determine a strategy corresponding to the selected user group as the optimal strategy.

Another aspect of the present disclosure is directed to systems and methods for adjusting the optimization model. The systems and methods may determine a parameter difference of the parameter regarding the first user group and the second user group. The systems and methods may further determine a reliability level of the parameter difference. Accordingly, the systems and methods may adjust the optimization model based on the parameter difference and the reliability level of the parameter difference.

Still another aspect of the present disclosure is directed to systems and methods for applying a multidimensional grouping method on users and a big data analysis method on user feedback to improve the accuracy and efficiency of a strategy evaluation process. Instead of grouping the users in one dimension, the systems and methods may group the users in multiple dimensions (e.g., age, gender, education background, etc.).

FIG. 1 is a schematic diagram of an exemplary strategy evaluation system according to some embodiments of the present disclosure. The strategy evaluation system 100 may include a server 110, a network 120, a storage device 130, and a user terminal 140. The strategy evaluation system 100 may evaluate two or more strategies using an optimization model (e.g., an A/B testing model). Merely for illustration purposes, the strategy evaluation system 100 may obtain certain behaviors of one or more users associated with a service (e.g., a taxi-hailing service, a delivery service, an advertisement service, an online shopping service, etc.) from the user terminal 140. The server 110 may classify the one or more users into two or more user groups, and the two or more user groups may correspond to the two or more strategies, respectively. For example, a first user group may correspond to a strategy for adjusting the price of the service dynamically, and a second user group may correspond to a strategy for the price of the service remaining unchanged. The server 110 may evaluate performances of the two strategies based on the obtained behaviors of the one or more users. In some embodiments, the one or more users are classified into groups according to multiple factors, such as job, age, education background, income, etc. In some embodiments, the strategy evaluation system 100 may adjust the optimization model based on a reliability level associated with the behaviors of the one or more users.

The server 110 may facilitate data processing for the strategy evaluation system 100. In some embodiments, the server 110 may be a single server or a server group. The server group may be centralized, or distributed (e.g., server 110 may be a distributed system). In some embodiments, the server 110 may be local or remote. For example, the server 110 may access information and/or data stored in the user terminal 140, and/or the storage device 130 via the network 120. As another example, the server 110 may be directly connected to the user terminal 140, and/or the storage device 130 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data to perform one or more functions described in the present disclosure. For example, the processing engine 112 may obtain a service request from the user terminal 140 of one or more users, and classify the one or more users into a first user group and a second user group according to a user grouping method. The first user group and the second user group may corresponding to two strategies, respectively As another example, the processing engine 112 may obtain behavior data of the one or more users (e.g., operation logs of the user terminal 140), determine, in one or more dimensions based on behavior data of the one or more users, a first value of a parameter (e.g., the number of service orders finished during a certain time period) regarding the first user group and a second value of the parameter regarding the second user group. The first value and the second value may be used to evaluate the two strategies to determine an optimal strategy. As still another example, the processing engine 112 may determine a parameter difference of the parameter regarding the first user group and the second user group based on the first value and the second value. As still another example, the processing engine 112 may determine a reliability level of the parameter difference. The parameter difference of the parameter and the reliability of the parameter difference may be used to evaluate the optimization model. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

The network 120 may facilitate the exchange of information and/or data. In some embodiments, one or more components in the strategy evaluation system 100 (e.g., the server 110, the storage device 130, and the user terminal 140) may send information and/or data to other component (s) in the strategy evaluation system 100 via the network 120. For example, the processing engine 112 may obtain behavior data of one or more users from the storage device 130 and/or the user terminal 140 via the network 120. In some embodiments, the network 120 may be any type of wired or wireless network, or a combination thereof. Merely by way of example, the network 120 may include a cable network, a wireline network, an optical fiber network, a telecommunications network, an intranet, the Internet, a local area network (LAN), a wide area network (WAN), a wireless local area network (WLAN), a metropolitan area network (MAN), a wide area network (WAN), a public telephone switched network (PSTN), a Bluetooth™ network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, ..., through which one or more components of the strategy evaluation system 100 may be connected to the network 120 to exchange data and/or information.

The storage device 130 may store data and/or instructions. In some embodiments, the storage device 130 may store data obtained from the user terminal 140 and/or the processing engine 112. For example, the storage device 130 may store behavior data of the one or more users obtained from the user terminal 140. As another example, the storage device 130 may store a user group of a user determined by the processing engine 112. In some embodiments, the storage device 130 may store data and/or instructions that the server 110 may execute or use to perform exemplary methods described in the present disclosure. For example, the storage device 130 may store instructions that the processing engine 112 may execute or use to determine a value of a parameter in one or more dimensions regarding a user group (e.g., the first user group, the second user group). As another example, the storage device 130 may store instructions that the processing engine 112 may execute or use to determine a parameter difference of the parameter regarding the first user group and the second user group. As still another example, the storage device 130 may store instructions that the processing engine 112 may execute or use to determine a reliability level of the parameter difference. In some embodiments, the storage device 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 120 to communicate with one or more components in the strategy evaluation system 100 (e.g., the server 110, the user terminal 140, etc.). One or more components in the strategy evaluation system 100 may access the data or instructions stored in the storage device 130 via the network 120. In some embodiments, the storage device 130 may be directly connected to or communicate with one or more components in the strategy evaluation system 100 (e.g., the server 110, the user terminal 140, etc.). In some embodiments, the storage device 130 may be part of the server 110.

In some embodiments, the user terminal 140 may include a mobile device 140-1, a tablet computer 140-2, a laptop computer 140-3, or the like, or any combination thereof. In some embodiments, the mobile device 140-1 may include a smart home device, a wearable device, a mobile equipment, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a bracelet, footgear, glasses, a helmet, a watch, clothing, a backpack, a smart accessory, or the like, or any combination thereof. In some embodiments, the mobile equipment may include a mobile phone, a personal digital assistance (PDA), a gaming device, a navigation device, a point of sale (POS) device, a laptop, a desktop, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc.

It should be noted that the strategy evaluation system 100 is merely provided for the purposes of illustration, and is not intended to limit the scope of the present disclosure. For persons having ordinary skills in the art, multiple variations or modifications may be made under the teachings of the present disclosure. For example, the strategy evaluation system 100 may further include a database, an information source, or the like. As another example, the strategy evaluation system 100 may be implemented on other devices to realize similar or different functions. However, those variations and modifications do not depart from the scope of the present disclosure.

Figure 2:
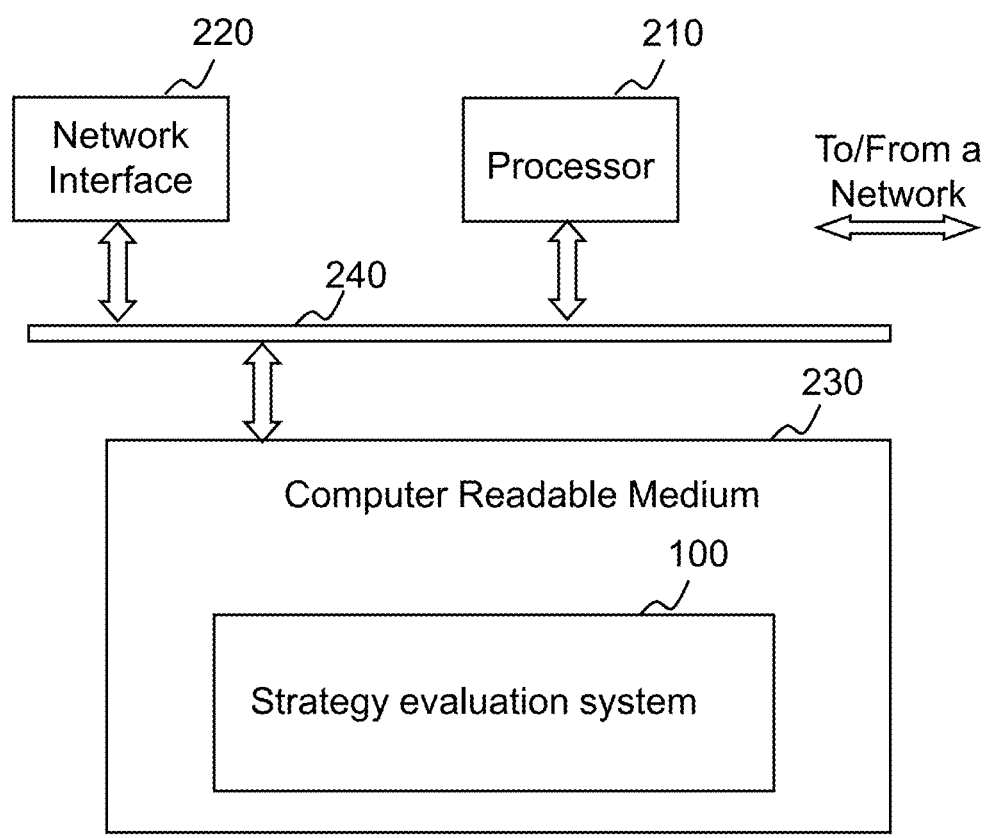
FIG. 2 is a schematic diagram illustrating exemplary components of a computing device according to some embodiments of the present disclosure.

FIG. 2 is a schematic diagram illustrating exemplary components of a computing device on which the server 110, the storage device 130, and/or the user terminal 140 may be implemented according to some embodiments of the present disclosure. The computer device 200 may include a processor 210, a network interface 220, and a computer readable medium 230. The computer device 200 may further include any other hardware according to the actual function of the server 110. The processor 210 may read and execute instructions associated with the strategy evaluation system 100 in the computer readable medium 230 to perform one or more functions described in the present disclosure. The computer readable medium 230 may include any electronic, magnetic, optical or physical storage device that may contain or store information such as executable instructions and/or data. For example, the computer readable storage medium 230 may include a random access memory (RAM), a volatile memory, a non-volatile memory, a flash memory, a storage drive (e.g., a hard disk drive), a solid state disk, a storage disk (e.g., CD, DVD, etc.), or the like, or any combination thereof.

The particular system may use a functional block diagram to explain the hardware platform containing one or more user interfaces. The computer may be a computer with general or specific functions. Both types of the computers may be configured to implement any particular system according to some embodiments of the present disclosure. Computing device 200 may be configured to implement any components that perform one or more functions disclosed in the present disclosure. For example, the computing device 200 may implement any component of the strategy evaluation system 100 as described herein. In FIGS. 1-2, only one such computer device is shown purely for convenience purposes. One of ordinary skill in the art would understood at the time of filing of this application that the computer functions relating to the strategy evaluation as described herein may be implemented in a distributed fashion on a number of similar platforms, to distribute the processing load.

The computing device 200, for example, may also include COM ports connected to and from a network connected thereto to facilitate data communications. The computing device 200 may include a processor (e.g., the processor 210), in the form of one or more processors (e.g., logic circuits), for executing program instructions. For example, the processor may include interface circuits and processing circuits therein. The interface circuits may be configured to receive electronic signals from a bus 240, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 240.

The exemplary computing device may include the internal communication bus 240, program storage and data storage of different forms including, for example, a disk, and a read only memory (ROM), or a random access memory (RAM), for various data files to be processed and/or transmitted by the computing device. The exemplary computing device may also include program instructions stored in the ROM, RAM, and/or other type of non-transitory storage medium to be executed by the processor 210. The methods and/or processes of the present disclosure may be implemented as the program instructions. The computing device 200 may also include an I/O component, supporting input/output between the computer and other components. The computing device 200 may also receive programming and data via network communications.

Merely for illustration, only one CPU and/or processor is illustrated in FIG. 2. Multiple CPUs and/or processors are also contemplated; thus operations and/or method steps performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
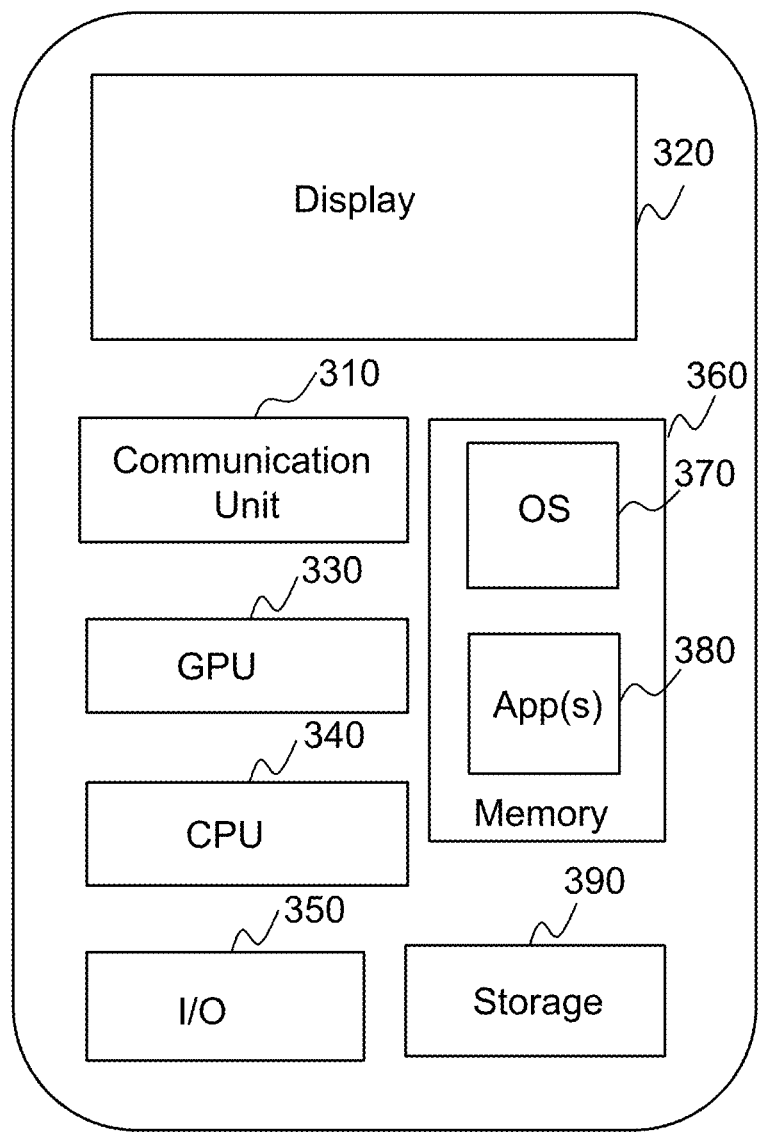
FIG. 3 is a schematic diagram illustrating exemplary hardware and/or software components of an exemplary user terminal according to some embodiments of the present disclosure.

FIG. 3 is a schematic diagram illustrating exemplary hardware and/or software components of an exemplary user terminal according to some embodiments of the present disclosure; on which the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. The CPU 340 may include interface circuits and processing circuits similar to the processor 220. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to a service request or other information from the location based service providing system on the mobile device 300. User interactions with the information stream may be achieved via the I/O devices 350 and provided to the processing engine 112 and/or other components of the strategy evaluation system 100 via the network 120.

In order to implement various modules, units and their functions described above, a computer hardware platform may be used as hardware platforms of one or more elements (e.g., a component of the sever 110 described in FIG. 2). Since these hardware elements, operating systems, and program languages are common, it may be assumed that persons skilled in the art may be familiar with these techniques and they may be able to provide information required in the route planning according to the techniques described in the present disclosure. A computer with user interface may be used as a personal computer (PC), or other types of workstations or terminal devices. After being properly programmed, a computer with user interface may be used as a server. It may be considered that those skilled in the art may also be familiar with such structures, programs, or general operations of this type of computer device. Thus, extra explanations are not described for the figures.

Figure 4:
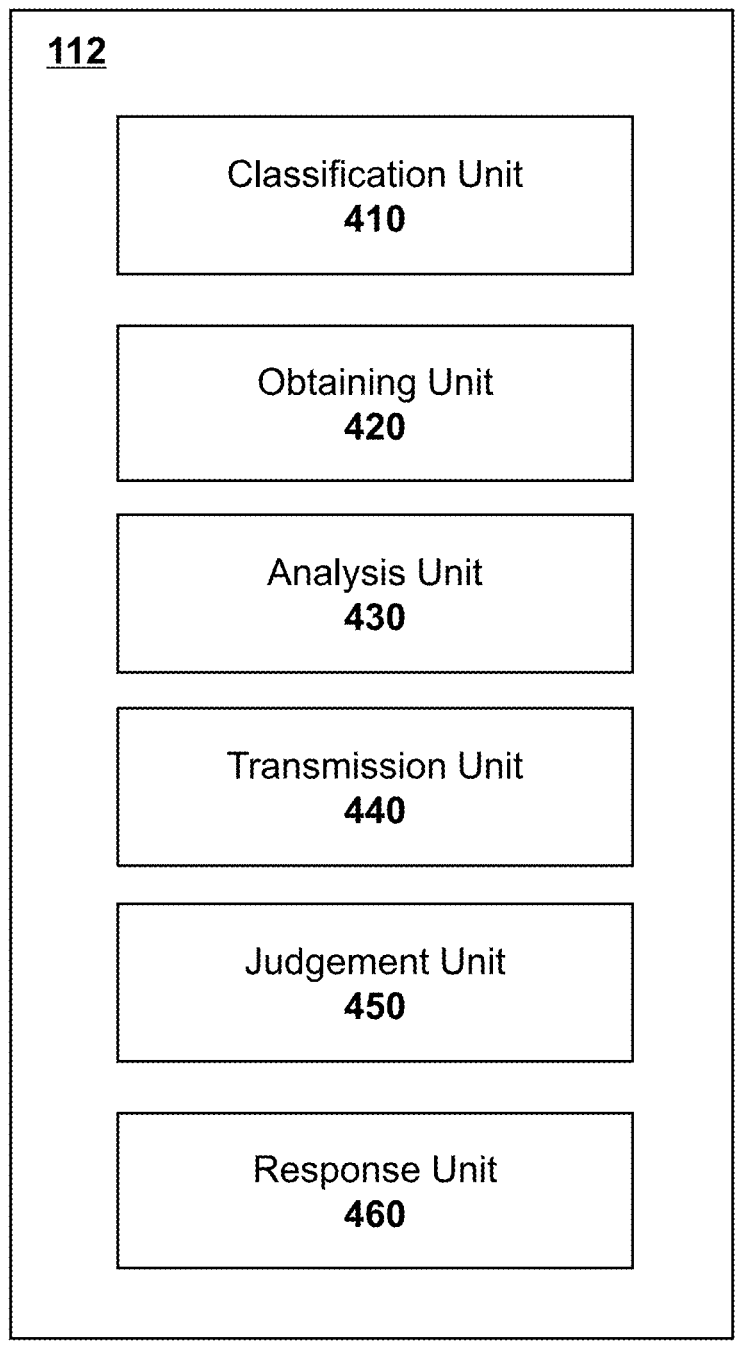
FIG. 4 is a schematic diagram illustrating an exemplary processing engine according to some embodiments of the present disclosure.

FIG. 4 is a schematic diagram illustrating an exemplary processing engine according to some embodiments of the present disclosure. The processing engine 112 may include a classification unit 410, an obtaining unit 420, an analysis unit 430, a transmission unit 440, a judgment unit 450, and a response unit 460. The units may be hardware circuits of at least part of the processing engine 112. The units may also be implemented as an application or set of instructions read and executed by the processing engine 112. Further, the units may be any combination of the hardware circuits and the application/instructions. For example, the units may be the part of the processing engine 112 when the processing engine 112 is executing the application/set of instructions.

The classification unit 410 may be configured to classify one or more users into a first user group and a second user group randomly. The first user group may correspond to a first strategy, and the second user group may correspond to a second strategy.

In some embodiments, the first user group and the second user group may correspond to two strategies of a target project (e.g., two strategies of a dynamical price adjustment project). In some embodiments, the classification unit 410 may classify the one or more users into the user groups using a random grouping algorithm. For example, the classification unit 410 may classify the one or more users using a salted hash algorithm. As another example, the classification unit 410 may assign a random number to each user, and classify the one or more users into two groups by comparing the random number with a preset threshold.

The obtaining unit 420 may be configured to obtain data and/or information related to the strategy evaluation system 100. In some embodiments, the obtaining unit 420 may obtain a plurality of service requests from the one or more users. In some embodiments, the service request may be a request for a service. In some embodiments, the obtaining unit 420 may obtain the behavior data of the one or more users. For example, the obtaining unit 420 may obtain the behavior data of the one or more users from user logs. In some embodiments, the terminals of the one or more users (e.g., the user terminal 140) may generate user logs based on user activities on the application. The user logs may include basic information of the user (e.g., user operation, user ID, the user group of the user, city of the user, gender of the user, operation system of the terminal of the user) and interactions of the user with the user terminal 140.

In some embodiments, the obtaining unit 420 may obtain the data and/or information related to the strategy evaluation system 100 from a user terminal (e.g., the user terminal 140), the storage device 130, and/or an external data source (not shown). In some embodiments, the obtaining unit 420 may obtain the data and/or information related to the strategy evaluation system 100 via the network 120.

The analysis unit 430 may be configured to determine a first value of a parameter in one or multiple dimensions regarding the first user group and a second value of the parameter in multiple dimensions regarding the second user group by analyzing the behavior data of the one or more users. In some embodiments, the analysis unit 430 may determine one or more subgroups from the first user group and the second user group in terms of the multiple dimensions, respectively. The analysis unit 430 may determine one or more first values of a parameter in multiple dimensions regarding the one or more subgroups in the first user group and one or more second values of the parameter in multiple dimensions regarding the one or more subgroups in the second user group based on a big data analysis method.

The analysis unit 430 may be configured to analyze information and/or data related to the strategy evaluation system 100. In some embodiments, the analysis unit 430 may determine a parameter for evaluating performances of the two strategies. Merely by ways of example, the parameter may be associated with order information of a service. Taking a taxi hailing service as an example, the parameter may include the number of service orders, an order acceptance rate, an average response time of the service orders, or the like, or any combination thereof. In some embodiments, the parameter may be in one or multiple dimensions. In some embodiments, the analysis unit 430 may determine the first value of the parameter regarding the first user group and the second value of the parameter regarding the second user group. For example, the analysis unit 430 may determine the first value of the parameter in multiple dimensions regarding the first user group and the second value of the parameter in multiple dimensions regarding the second user group based on behavior data of the one or more users using a big data analysis method. In some embodiments, the analysis unit 430 may select a user group from the first user group and the second user group. Merely by way of example, the analysis unit 430 may select the user group from the first user group and the second user group by comparing the first value and the second value. In some embodiments, the analysis unit 430 may designate a strategy corresponding to the selected user group as an optimal strategy.

The transmission unit 440 may be configured to transmit the first value and the second value to a visual interface of a terminal device. For example, the transmission unit 440 may transmit the first value and the second value to the visual interface of the terminal device. In some embodiments, the visual interface of the terminal device may display the first value and the second value in the form of text, graph, audio, video, or the like, or a combination thereof. The first value and the second value may be used to determine an optimal strategy from the first strategy and the second strategy.

The judgment unit 450 may be configured to determine whether a user belongs to any one of the first user group and the second user group when the strategy evaluation system 100 obtains a service request from the user. If the user does not belong to a user group, the classification unit 410 may classify the user into a user group. If the user belongs to one of the first user group and the second user group, the response unit 460 may response the service request.

The response unit 460 may be configured to response the service request from the user if the user belongs to one of the first user group and the second user group. Take a taxi-hailing service as an example, the response unit 460 may send the service request to a plurality of service providers (e.g., a driver) that are available to accept the service request.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. For example, the processing engine 112 may further include a storage module facilitating data storage. As another example, the judgment unit 450 and/or the response unit 460 may be omitted. However, those variations and modifications do not depart from the scope of the present disclosure.

Figure 5:
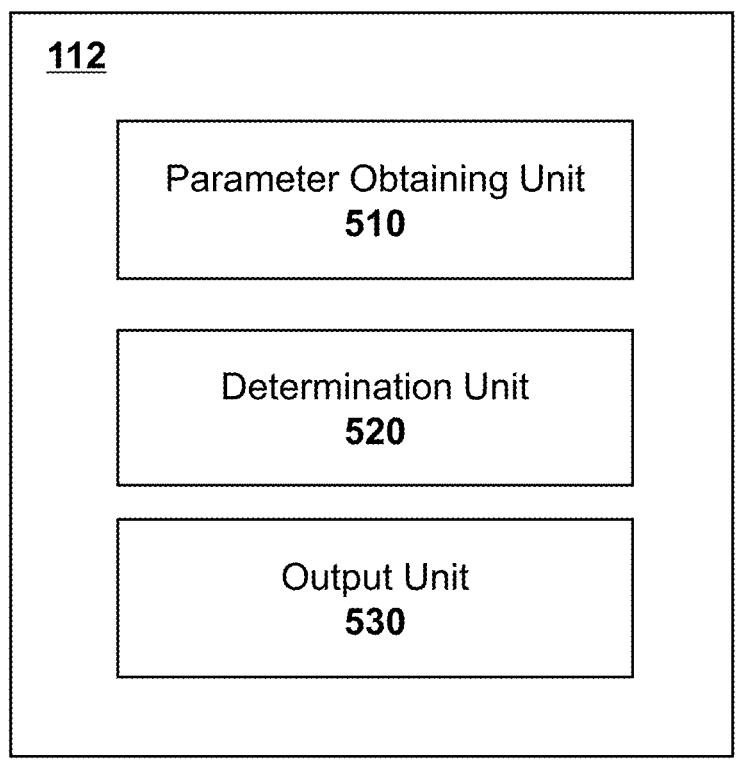
FIG. 5 is a schematic diagram illustrating an exemplary processing engine according to some embodiments of the present disclosure.

FIG. 5 is a schematic diagram illustrating an exemplary processing engine according to some embodiments of the present disclosure. In some embodiments, the processing engine 112 may include a parameter obtaining unit 510, a determination unit 520, and an output unit 530. The units may be hardware circuits of at least part of the processing engine 112. The units may also be implemented as an application or set of instructions read and executed by the processing engine 112. Further, the units may be any combination of the hardware circuits and the application/instructions. For example, the units may be the part of the processing engine 112 when the processing engine 112 is executing the application/set of instructions.

The parameter obtaining unit 510 may be configured to obtain the first value of a parameter regarding the first user group and the second value of the parameter regarding the second user group. In some embodiments, the parameter obtaining unit 510 may obtain the first value and the second value from the analysis unit 430. In some embodiments, the parameter obtaining unit 510 may obtain the first value and the second value from the storage device 130 and/or an external data source (not shown). The obtained first value and second value may be used to evaluate and/or adjust the optimization model.

The determination unit 520 may be configured to determine evaluation results associated with the optimization model. In some embodiments, the determination unit 520 may determine a parameter difference of the parameter regarding the first user group and the second user group based on the first value, the second value, and systematic errors of the optimization model. In some embodiments, the parameter difference may be a difference value (also refer to as "first difference value") or a ratio value. Merely by ways of example, the first difference value may be determined based on systematic errors of the optimization model (also referred to as "second difference value") and the difference between the first value and the second value (also referred to as "third difference value"). In some embodiments, the correction model may be the same as or similar to the optimization model except that the correction model associates the first user group and the second user group with a same strategy. For example, in an A/A testing process, the first user group and the second user group may correspond to the first strategy or the second strategy in the A/B testing process.

In some embodiments, the determination unit 520 may determine a reliability level of the parameter difference. The reliability level of the parameter difference may refer to a repeatability of the parameter difference when measurements are repeated a number of times. In some embodiments, the determination unit 520 may determine the reliability level based on a confidence interval of the parameter difference (e.g., a first difference value) at a preset confidence coefficient. As another example, the determination unit 520 may determine the reliability level based on a comparison of a P value of the parameter difference (e.g., the first difference value) with a significance value. As still another example, the determination unit 520 may determine the reliability level based on a confidence interval of the parameter difference (e.g., the difference value, the ratio value) at a preset confidence coefficient and a P value of the parameter difference.

The output unit 530 may be configured to adjust the optimization model. In some embodiments, the output unit 530 may adjust the optimization model based on the evaluation results associated with the optimization model. In some embodiments, the output unit 530 may determine a plurality of parameter differences corresponding to a plurality of parameters (e.g., the number of service orders, expenses on the service, user ratings, etc.) regarding the first user group and the second user group. In some embodiments, the output unit 530 may determine a final score relating to the optimization model based on parameter differences and the reliability level of the parameter differences. As used herein, the final score relating to the optimization model maybe an evaluation result of the optimization model in terms of the plurality of parameters. In some embodiment, the final score relating to the optimization model may be determined based on scores for the plurality of parameter and weights of the plurality of parameters. In some embodiments, a weight of a parameter may indicate importance of the parameter in the evaluation of the optimization model.

In some embodiments, the output unit 530 may adjust the optimization model based on the final score relating to the optimization model. For example, the output unit 530 may adjust the way that the one or more users are classified into the two groups. As another example, the output unit 530 may adjust the way that the first value and the second value of the parameter are determined. Merely for illustration purposes, the adjustment of the optimization model may be an iterative process including one or more iterations. During each iteration, the output unit 530 may adjust the optimization model based on the final score relating to the optimization model. In some embodiments, the iterative process may terminate when the final score is not less than a threshold. In some embodiments, the iterative process may terminate when a certain number of iterations (e.g., 100 rounds, 300 rounds, etc.) is complete.

It should be noted that the above description of the processing engine 112 is merely provided for the purposes of illustration, and not intended to limit the scope of the present disclosure. For persons having ordinary skills in the art, multiple variations and modifications may be made under the teachings of the present disclosure. For example, the processing engine 112 may further include a storage unit facilitating data storage. As another example, the parameter obtaining unit 510 may be omitted. However, those variations and modifications do not depart from the scope of the present disclosure.

Figure 6:
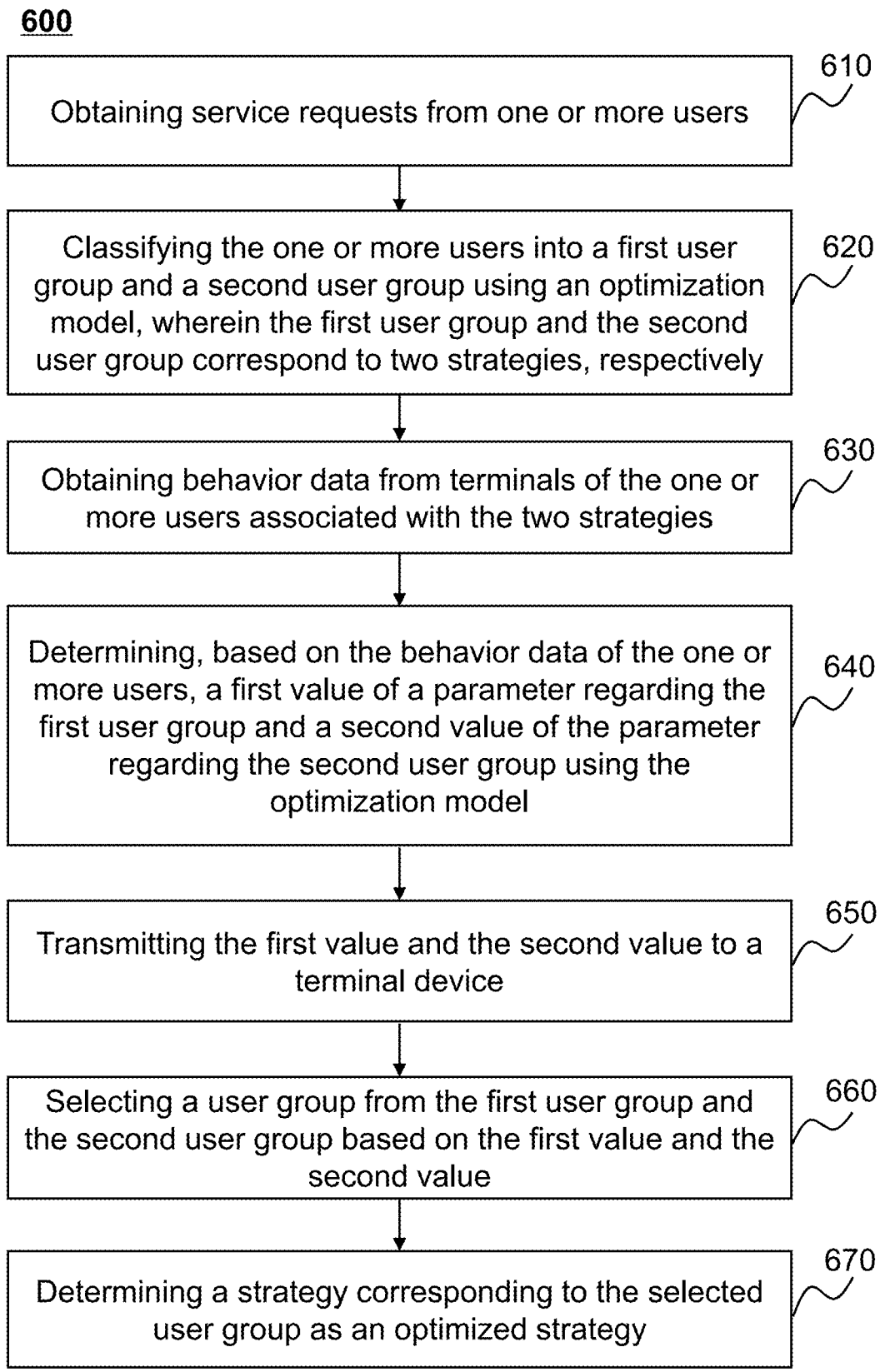
FIG. 6 is a flow chart illustrating an exemplary process for determining an optimal strategy according to some embodiments of the present disclosure.

FIG. 6 is a flow chart illustrating an exemplary process 600 for determining an optimal strategy according to some embodiments of the present disclosure. In some embodiments, the process 600 may be implemented in the strategy evaluation system 100. For example, the process 600 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110).

In 610, a plurality of service requests may be obtained from one or more users. The plurality of service requests may be obtained by, for example, the obtaining unit 420. In some embodiments, the obtaining unit 420 may obtain the service requests from the user terminal(s) 140 of the one or more users via the network 120.

In some embodiments, the user terminal 140 may establish a communication (e.g., wireless communication) with the server 110, for example, through an application (e.g., the application 380 in FIG. 3) installed in the user terminal 140. In some embodiments, the application may be associated with a service (e.g., an online to offline service). For example, the application may be associated with a taxi-hailing service. In some embodiments, the user may log into the application, and initiate a service request by selecting one or more options on an interface of the application. In some embodiments, the application installed in the user terminal 140 may direct the user terminal 140 to monitor service requests from the user continuously or periodically, and automatically transmit the service requests to the processing engine 112 via the network 120.

In some embodiments, the service request may be a request for a service. Merely for illustration purposes, the service may include a taxi service, a carpooling service, a hitch service, a delivery service, an online shopping service, a party organization service, an unmanned driving service, a medical service, a map-based service (e.g., a route planning service), a live chatting service, a query service, a sensorial experience service, or the like, or any combination thereof. Take a taxi-hailing service as an example, the service request may include a departure location, a destination, a start time, etc. The departure location may refer to a location where a requester starts his/her journey. The destination may refer to a location where the requester ends his/her journey. The service request may further include a user's identity information (e.g., an identification (ID), a telephone number, a user's name, etc.).

In 620, the one or more users may be classified into a first user group and a second user group using an optimization model. The one or more users may be classified by, for example, the classification unit 410. In some embodiments, the optimization model (e.g., an A/B testing model) may be in forms of a collection of logic codes configured to perform multiple functions. For example, the optimization model may be used to classify the one or more users into the first user group and the second user group. The first user group and the second user group may correspond to two strategies of a target project (e.g., two strategies of a dynamical price adjustment project). The optimization model may compare the two strategies and determine an optimal strategy from the two strategies. As used herein, a strategy may refer to a method or a plan to achieve the target project. The strategy may be visible or invisible. For example, the strategy may include a certain design or function of an application in the user terminal(s) 140 of the one or more users. As another example, the strategy may include a dynamic price adjustment algorithm.

Merely for illustration purposes, the first strategy may be multiplying the price of a service by a coefficient 1 at peak hours (e.g., 8:00-9:00, 17:00-18:00, etc.), and the second strategy may be multiplying the price by a coefficient 1.5 at peak hours. In some embodiments, the first user group may be a treatment group, and the second user group may be a control group. In some embodiments, the first user group may be the control group, and the second user group may be the treatment group.

The classification unit 410 may classify the one or more users into two groups when the strategy evaluation system 100 obtains service requests from the one or more users. In some embodiments, the judgment unit 450 may determine whether a user belongs to any one of the two user groups when the strategy evaluation system 100 obtains a service request from the user. In some embodiments, the judgment unit 450 may determine whether the user belongs to a user group based on, for example, user identity information in the service request. Upon a determination that the user belongs to a certain user group, the classification unit 510 may classify the user into the user group. Upon a determination that the user does not belong to a user group, the classification unit 410 may classify the user into a user group based on a random grouping algorithm. For example, the classification unit 410 may classify the one or more users using a salted hash algorithm. As another example, the classification unit 410 may classify the one or more users based on a random number assigned for each user and a preset threshold. More descriptions regarding the classification of a user into one of two groups based on the random number and the preset threshold may be found elsewhere in the present disclosure (e.g., FIG. 8 and the descriptions thereof). After classifying the one or more users into the two user groups, the processing engine 112 may store the user groups in a storage device (e.g., the storage device 130) of the strategy evaluation system 100. The classification unit 410 may access the storage device and retrieve the user groups.

In some embodiments, after a user is classified into a user group, the response unit 460 may respond to the service request obtained from the user. Take a taxi-hailing service as an example, the response unit 460 may send the service request to a plurality of service providers (e.g., a driver) that are available to accept the service request.

In 630, behavior data may be obtained from terminals of the one or more users associated with the two strategies. The behavior data may be obtained by, for example, the obtaining unit 420. In some embodiments, the terminals of the one or more users (e.g., the user terminal 140) may generate user logs based on user activities on the application. As used herein, the user logs may refer to a set of files that record user activities (e.g., select a service option in an application) when the user operates the application. The user logs may include basic information of the user (e.g., user operation, user ID, the user group of the user, city of the user, gender of the user, operation system of the terminal of the user) and the behavior data of the user. Merely for illustration purposes, the terminal of a user may generate a user log "JASON: {"event_id": "fast_order_click"; "passenger_id": "115116"; "test_group": "treatment"; "city": "beijing"; "gender": "man"; "system_type": "iOS"}", where "event_id" may refer to an user operation, "fast_order_click" may refer that the user operation is requesting an order, "passenger_id" may refer to a user ID, "115116" may refer that the user ID is 115116, "test_group" may refer to the user group that the user belongs to, "treatment" may refer to that the user belongs to the treatment group, "city" may refer to the city where the user is, "beijing" may refer to that the user is in Beijing, "gender" may refer to the gender of the user, "man" may refer to that the gender of the user is man, "system_type" may refer to the type of the operation system of the terminal of the user, "iOS" may refer to that the operation system of the terminal of the user is iOS.

The obtaining unit 420 may continuously or periodically obtain the user logs from the terminals of the one or more users. In some embodiments, the terminals of the one or more users may transmit the user logs to the storage device (e.g., the storage device 130) via the network 120 continuously or periodically. The obtaining unit 420 may access the storage device, and retrieve the user logs. In some embodiments, the obtaining unit 420 may obtain the user logs using a Hadoop Distribute File System.

In 640, a first value of a parameter regarding the first user group and a second value of the parameter regarding the second user group may be determined based on behavior data of the one or more users using the optimization model. The first value and the second value may be determined by, for example, the analysis unit 430. The parameter may indicate user feedbacks from the one or more users on the first strategy and the second strategy. In some embodiments, the parameter may reflect the user preferences for the first strategy and the second strategy. Merely by ways of example, the parameter may be associated with order information of an online to offline service. Taking a taxi hailing service as an example, the parameter may include the number of service orders, an order acceptance rate, an average response time of the service orders, or the like, or any combination thereof. In some embodiments, the parameter may be in multiple dimensions. In some embodiments, the multiple dimensions may be represented by multiple attributes of the user. For example, the multiple dimensions may include the age of the user, the gender of the user, the city where the user lives, the operation system of the terminal of the user, or the like, or any combination thereof. Merely for illustration purposes, a parameter "average number of service orders" in multiple dimensions like "Beijing", "man", and "iOS" may refer that the average number of service orders for men in Beijing using a terminal with an iOS operation system. In some embodiments, the parameter and/or the multiple dimensions of the parameters may be selected according to scenario applications. More descriptions regarding the multiple dimensions may be found elsewhere in the present disclosure (e.g. FIG. 7B and the descriptions thereof).

In some embodiments, the analysis unit 430 may determine the first value of the parameter in one or multiple dimensions regarding the first user group and the second value of the parameter in one or multiple dimensions regarding the second user group based on the behavior data using a big data analysis method. Taking a taxi hailing service as an example, the parameter may be "average number of service orders", and the dimension may be "Beijing". The analysis unit 430 may determine a subgroup based on the behavior data of the users in the first group and the dimension. The users in the subgroup may be people who live in Beijing in the first user group. The analysis unit 430 may further determine the average number of service orders (i.e., the first value) of the users in the subgroup based on behavior data of the users. Similarly, the analysis unit 430 may determine the second value based on the behavior data of users in the second user group. As another example, the parameter may be "average number of service orders", and the multiple dimensions may be "Beijing", "man", and "iOS". The analysis unit 430 may determine a subgroup based on the behavior data of the users in the first user group and the multiple dimensions. The users in the subgroup may select men in Beijing who use IOS operation systems in their terminals from the first user group. The analysis unit 430 may further determine the average number of service orders (i.e., the first value) of the users in the subgroup based on behavior data of the users. Similarly, the analysis unit 430 may determine the second value based on the behavior data of users in the second user group.

In 650, the first value and the second value may be transmitted to a terminal device. The first value and the second value may be transmitted by, for example, the transmission unit 440. The terminal device herein may be used to display information associated with the strategy evaluation system 100 (e.g., the first value, the second value) to a user (e.g., a technician, a decision maker associated with the two strategies). In some embodiments, the transmission unit 440 may transmit the first value and the second value to a visual interface of the terminal device via the network 120. The visual interface of the terminal device may display the first value and the second value in the form of text, graph, audio, video, or the like, or any combination thereof.

In 660, a user group may be selected from the first user group and the second user group based on the first value and the second value. The user group may be selected by, for example, the analysis unit 430. In some embodiments, the analysis unit 430 may select the user group from the first user group and the second user group by comparing the first value and the second value. Merely for illustration purposes, if the parameter is "the number of service orders", the analysis unit 430 may designate a user group with a greater number of service orders as a selected user group.

In 670, a strategy corresponding to the selected user group may be determined as an optimal strategy. The optimal strategy may be determined by, for example, the analysis unit 430. The optimal strategy may be applied to the target project. For example, an optimal strategy of multiplying the price of a service by a coefficient 1 at peak hours (e.g., 8:00-9:00, 17:00-18:00, etc.) may be applied to a dynamical price adjustment project in a taxi-hailing service.

It should be noted that the above description is merely provided for the purposes of illustration, and not intended to limit the scope of the present disclosure. For persons having ordinary skills in the art, multiple variations and modifications may be made under the teachings of the present disclosure. In some embodiments, process 600 may be performed multiple times to determine an optimal strategy from a plurality of strategies. In some embodiments, one or more steps may be added or omitted. For example, step 650 may be omitted. As another example, step 660 and step 670 may be integrated into a single step. However, those variations and modifications do not depart from the scope of the present disclosure.

Figure 7A:
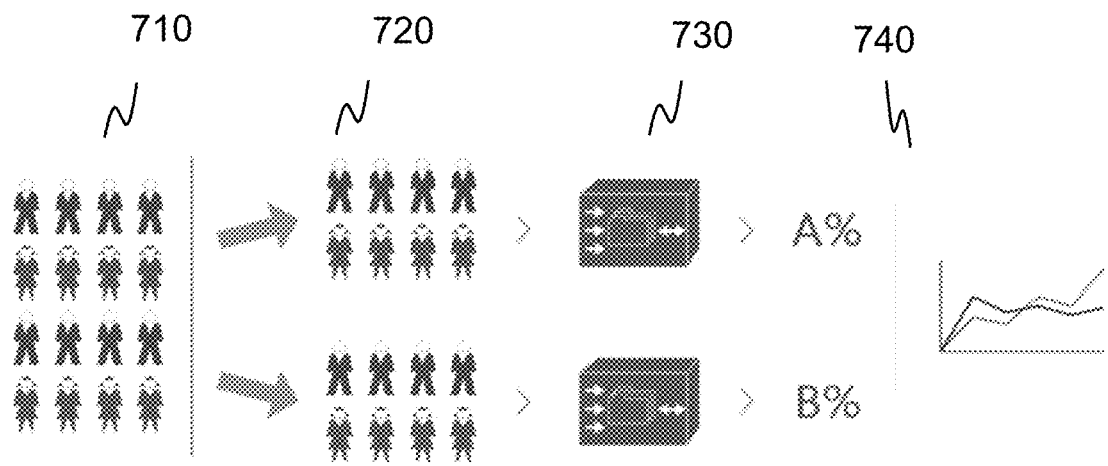
FIG. 7A is a schematic diagram illustrating an exemplary process for determining an optimal strategy according to some embodiments of the present disclosure.

FIG. 7A is a schematic diagram illustrating an exemplary process for determining an optimal strategy according to some embodiments of the present disclosure. In some embodiments, the process 700 may illustrate the process for determining an optimal strategy in combination with the process 600 in FIG. 6. As shown in FIG. 7, a plurality of service requests may be obtained from a plurality of users in 710, and the plurality of users may be classified into a first user group and a second user group in 720. For example, the plurality of users may be classified into the two user groups according to a classification algorithm, such as a piecewise function, a machine learning model. The first user group and the second user group may correspond to two strategies, respectively. Behavior data of the plurality of users associated with the two strategies may be obtained from terminals of the plurality of users in 730. Then a first value and a second value of a parameter in multiple dimensions (e.g., the number of service orders of men in Beijing in a month) regarding the first user group and the second user group may be determined, respectively. The first value and the second value may be compared in forms of, for example, a diagram in 740. Finally, an optimal strategy may be determined from the two strategies based on the comparison of the first value and the second value.

Figure 7B:
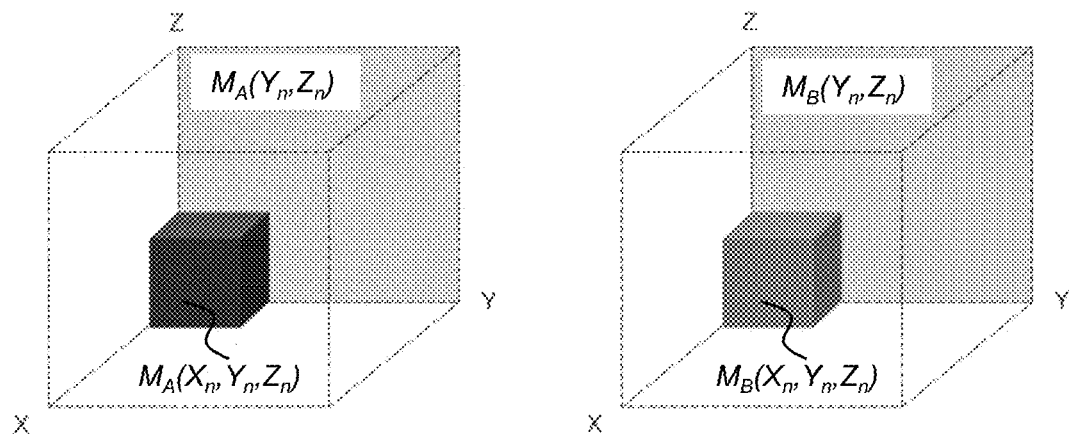
FIG. 7B is a schematic diagram illustrating an exemplary parameter in multiple dimensions according to some embodiments of the present disclosure.

FIG. 7B is a schematic diagram illustrating an exemplary parameter in multiple dimensions according to some embodiments of the present disclosure. As illustrated in FIG. 7B, three axes X, Y, and Z refer to three dimensions of a parameter M (e.g., number of service orders, negative feedbacks of the service orders, etc.). For example, the axis X may refer to the city where a user lives, the axis Y may refer to the gender of the user, and the axis Z may refer to the education background of the user. $M_A$ may refer to a value of the parameter regarding a first user group. $M_B$ may refer to a value of the parameter regarding a second user group. $M_A(Y_n, Z_n)$ and $M_A(X_n, Y_n, Z_n)$ may refer to first values of the parameter M in two dimensions (i.e., dimensions Y and Z) and in three dimensions (i.e., dimensions X, Y, and Z) regarding the first user group, respectively. $M_B(Y_n, Z_n)$ and $M_B(X_n, Y_n, Z_n)$ may refer to second values of the parameter M in two dimensions (i.e., dimensions Y and Z) and in three dimensions (i.e., dimensions X, Y, and Z) regarding the second user group, respectively. Merely by way of example, $M_A(X_n, Y_n, Z_n)$ may refer to the number of service orders from men in Beijing whose education background is undergraduate.

Figure 8:
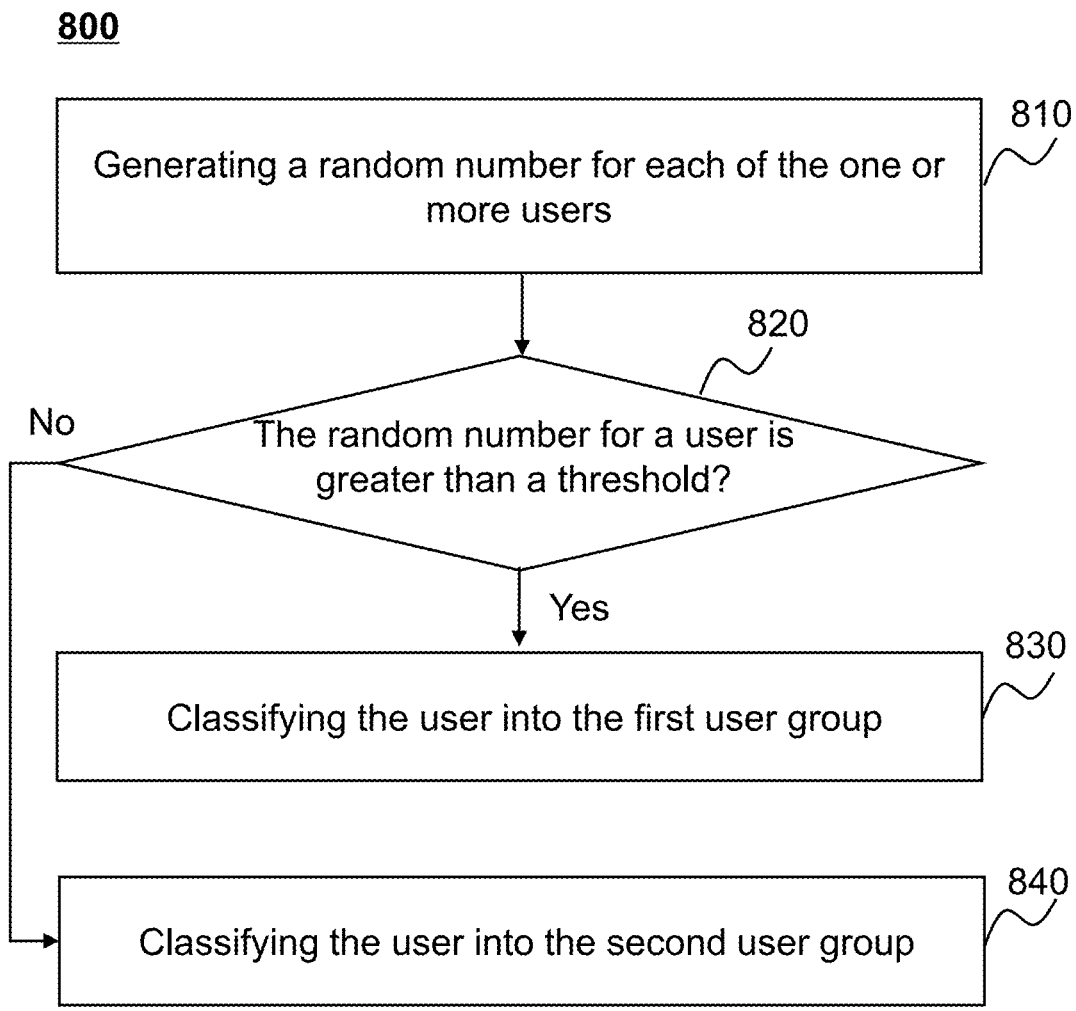
FIG. 8 is a flow chart illustrating an exemplary process for classifying one or more users into a user group according to some embodiments of the present disclosure.

FIG. 8 is a flow chart illustrating an exemplary process 800 for classifying one or more users into a user group according to some embodiments of the present disclosure. In some embodiments, the process 800 may be implemented in the strategy evaluation system 100. For example, the process 800 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, one or more operations in the process 800 may be performed by the classification unit 410.

In 810, a random number for each of the one or more users may be generated. In some embodiments, the random number may be any positive numbers, for example, 0.8, 1, 5, 12, 88, etc. In some embodiments, the random numbers may be in a certain range, for example, 1~100.

In 820, a determination may be made as to whether the random number for a user is greater than a threshold. The threshold may be set by a user (e.g., a technician, a decision maker associated with the two strategies), according to default settings of the strategy evaluation system 100, or adjusted under different situations. In some embodiments, the threshold may be a predetermined number of users in the first user group. In some embodiments, the threshold may be a value that corresponds to a predetermined percentage (e.g., 40%, 60%, or 80%) of the users in the first user group in terms of all of the plurality of the users. For example, if percentages of the users in the first user group and the second user group are 60% and 40%, respectively, the threshold may be set as 60.

If the random number of the user is greater than the threshold, the process 800 may proceed to 830. In 830, the classification unit 410 may classify the user into the first user group.

If the random number of the user is not greater than the threshold, the process 800 may proceed to 840. In 840, the classification unit 410 may classify the user into the second user group.

Figure 9:
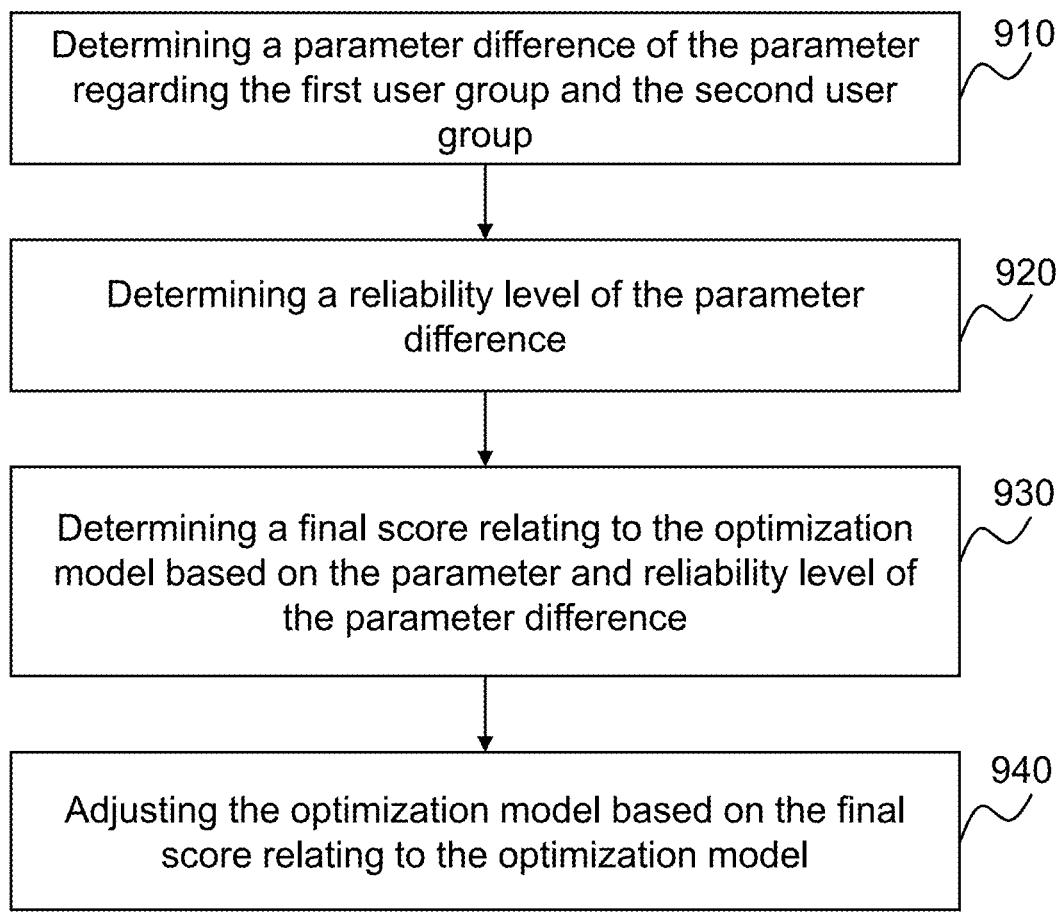
FIG. 9 is a flow chart illustrating an exemplary process for adjusting an optimization model according to some embodiments of the present disclosure.

FIG. 9 is a flow chart illustrating an exemplary process 900 for adjusting an optimization model according to some embodiments of the present disclosure. In some embodiments, the process 900 may be implemented in the strategy evaluation system 100. For example, the process 900 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, the operations in the process 900 may be performed by the determination unit 520 and/or the output unit 530.

In 910, a parameter difference of the parameter regarding the first user group and the second user group may be determined. In some embodiments, the parameter difference may represent a difference between the first value of the parameter regarding the first user group and the second value of the parameter regarding the second user group if the optimization model has no systematic errors. In some embodiments, the systematic errors of the optimization model may relate to algorithms used in the optimization model. In some embodiments, the parameter difference may be a difference value (also refer to as "first difference value") or a ratio value. In some embodiments, if the systematic errors of the optimization model are considered, the first difference value may be determined based on systematic errors of the optimization model (also referred to as "second difference value") and the difference between the first value of the parameter regarding the first user group and the second value of the parameter regarding the second user group (also referred to as "third difference value"). For example, the first difference value may be determined by subtracting the second difference value from the third difference. In some embodiments, the second difference value may be determined using a correction model (e.g., an A/A testing model).

In some embodiments, if the systematic errors of the optimization model are considered, the ratio value may be determined based on systematic errors of the optimization model and a ratio between the first value and the second value. For example, the ratio value may be determined by dividing the second value by the first value, then multiplying the quotient of the second value and the first value by a correction coefficient associated with the systematic errors of the optimization model.

In 920, a reliability level of the parameter difference may be determined. As used herein, the reliability level of the parameter difference may refer to a repeatability of the parameter difference when measurements are repeated for a number of times. The determination unit 520 may determine the reliability level in various ways. In some embodiments, the determination unit 520 may determine the reliability level based on a confidence interval of the parameter difference (e.g., the first difference value) at a preset confidence coefficient. The confidence interval of the parameter difference at the preset confidence coefficient may refer to that the probability that parameter difference (e.g., the first difference value) falls in the confidence interval is associated with the preset confidence coefficient. Merely for illustration purpose, the confidence interval (e.g., (50, 80)) of the parameter difference at a preset confidence coefficient (e.g., 95%) may refer to the probability that the parameter difference falls in the range of (50, 80) is 95%. The preset confidence coefficient may be set manually by a user, or determined by one or more components of the strategic evaluation system 100 according to default settings. For example, the preset confidence coefficient may be 90%, 95%, or 99%. More descriptions regarding the determination of the reliability level based on the confidence interval of the difference value at the preset confidence coefficient may be found elsewhere in the present disclosure (e.g., FIG. 12 and the descriptions thereof).

In some embodiments, the determination unit 520 may determine the reliability level based on a comparison of a P value of the parameter difference (e.g., the first difference value) with a significance value. The comparison of the P value of the difference value with the significance value may be referred to as a hypothesis testing, which may be used to evaluate a null hypothesis and an alternative hypothesis about the parameter difference. The null hypothesis and the alternative hypothesis may be proposed by a user, or one or more components of the strategic evaluation system 100 according to default settings. Merely by way of example, the null hypothesis may be that the first value of the parameter regarding the first user group is the same as the second value of the parameter regarding the second user group (i.e., the third difference value is 0). The alternative hypothesis may be that the first value of the parameter regarding the first user group is different from the second value of the parameter regarding the second user group (i.e., the third difference value is not 0).

In some embodiments, the significance value may be set manually by a user, or determined by one or more components of the strategic evaluation system 100 according to default settings. For example, the significance value may be 0.01, 0.05, or 0.10. Merely for illustration purpose, if the P value is less than or equal to the significance value (e.g., $P \leq 0.05$), the null hypothesis may be rejected, and the alternative hypothesis may be accepted. If the P value is greater than the significance value (e.g., $P > 0.05$), the null hypothesis may be accepted. More descriptions of the determination of the reliability level based on the comparison of the P value of the first difference value with the significance value may be found elsewhere in the present disclosure (e.g., FIG. 13 and the descriptions thereof).

In some embodiments, the determination unit 520 may determine the reliability level based on a confidence interval of the parameter difference (e.g., the difference value, the ratio value) at a preset confidence coefficient and a P value of the parameter difference. For example, the determination unit 520 may determine the confidence interval of the ratio value at the preset confidence coefficient, then compare a P value of the ratio value with a significance value.

In 930, a final score relating to the optimization model may be determined based on the parameter difference and the reliability level of the parameter difference. In some embodiments, the output unit 530 may determine a plurality of parameter differences corresponding to a plurality of parameters (e.g., the number of service orders, expenses on the service, user ratings, etc.) regarding the first user group and the second user group. The output unit 530 may determine a plurality of reliability levels of the plurality of parameter differences. The output unit 530 may determine a score relating to the optimization model for each parameter based on the parameter difference of the parameter and the reliability level of the parameter difference. As used herein, a score for a parameter may be an evaluation result of the optimization model in terms of the parameter. The output unit 530 may further determine a final score relating to the optimization model based on the scores for the plurality of parameter and weights of the plurality of parameters. As used herein, the final score may be an evaluation result of the optimization model in terms of the plurality of parameters. The weight of a parameter may indicate importance of the parameter in the evaluation of the optimization model. Merely for illustration purposes, a first score for a first parameter, a second score for a second parameter, and a third score for a third parameter are 80, 90, and 95, respectively, and a first weight of the first parameter, a second weight of the second parameter, and a third weight of the third parameter are 20%, 30%, and 50%, respectively, the final score may be 90.5 (80×20%+90×30%+95×50%=90.5).

In 940, the optimization model may be adjusted based on the final score relating to the optimization model. In some embodiments, the output unit 530 may adjust the optimization model if the final score is less than a threshold. For example, the output unit 530 may adjust the way that the one or more users are classified into the two groups. As another example, the output unit 530 may adjust the way that the first value and the second value of the parameter are determined. In some embodiments, the adjustment of the optimization model may be an iterative process including one or more iterations. During each iteration, the output unit 530 may adjust the optimization model based on the final score relating to the optimization model. In some embodiments, the iterative process may terminate when the final score is not less than the threshold. In some embodiments, the iterative process may terminate when a certain number of iterations (e.g., 100 rounds, 300 rounds, etc.) is complete.

It should be noted that the above description is merely provided for the purposes of illustration, and not intended to limit the scope of the present disclosure. For persons having ordinary skills in the art, multiple variations and modifications may be made under the teachings of the present disclosure. In some embodiments, one or more steps may be added or omitted. For example, step 930 and step 940 may be integrated into a single step. However, those variations and modifications do not depart from the scope of the present disclosure.

Figure 10:
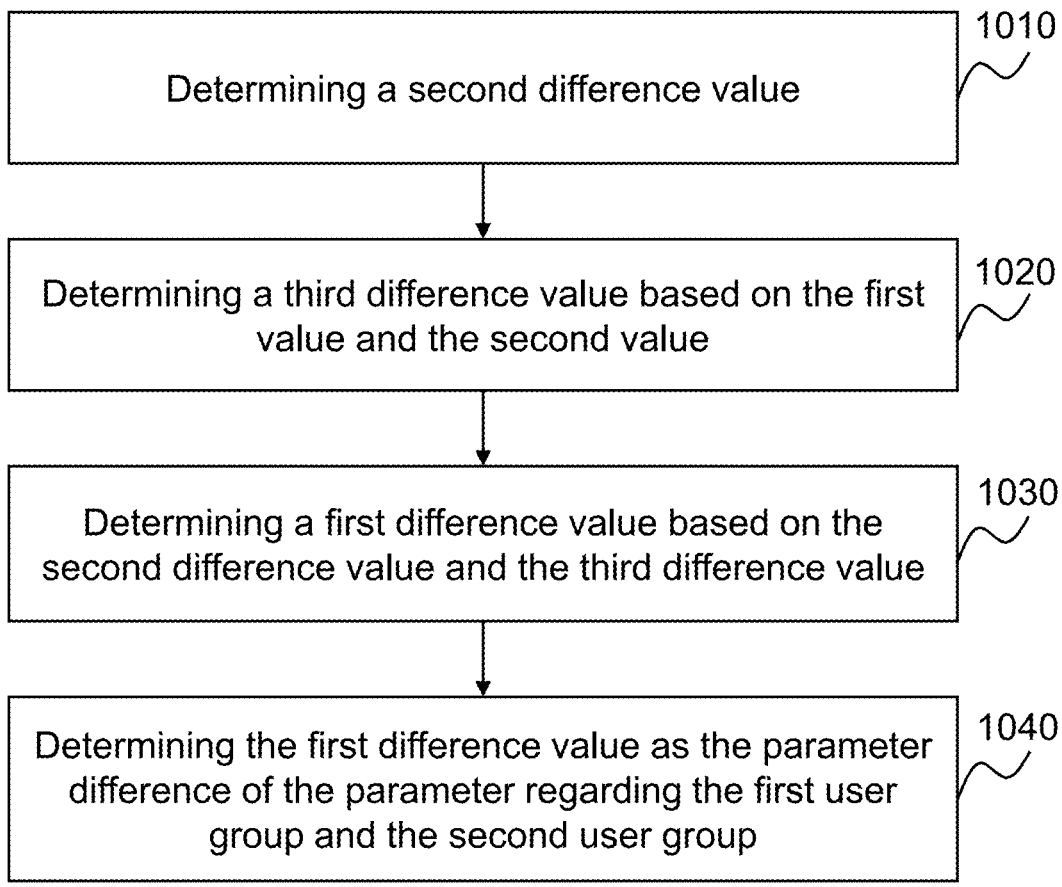
FIG. 10 is a flow chart illustrating an exemplary process for determining a parameter difference according to some embodiments of the present disclosure.

FIG. 10 is a flow chart illustrating an exemplary process 1000 for determining a parameter difference of a parameter according to some embodiments of the present disclosure. In some embodiments, the process 1000 may be implemented in the strategy evaluation system 100. For example, the process 1000 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, the operations in the process 1000 may be performed by the determination unit 520.

In 1010, a second difference value may be determined. The second difference value may refer to the systematic errors of the optimization model. In some embodiments, the determination unit 520 may determine the second difference value based on a third value of the parameter regarding the first user group and a fourth value of the parameter regarding the second user group. The third value and the fourth value may be determined using a correction model (e.g., an A/A testing model). For example, the second difference value may be determined by subtracting the fourth value from the third value. More descriptions of the determination of the second difference value may be found elsewhere in the present disclosure (e.g., FIG. 11 and the descriptions thereof).

In 1020, a third difference value may be determined based on the first value and the second value. In some embodiments, the third difference value may be a difference between the first value and the second value. For example, the determination unit 520 may determine the third difference value by subtracting the first value (or the second value) from the second value (or the first value).

In 1030, a first difference value may be determined based on the second difference value and the third difference value. In some embodiments, the determination unit 520 may determine the first difference value by subtracting the second difference value from the third difference value, thus eliminating or reducing the systems errors. For example, the second difference value is 0.4 and the third difference value is 1.2. The first difference value may be 0.8 (1.2−0.4=0.8). In some embodiments, the determination unit 520 may determine the first difference value using a CausalImpact model. In some embodiments, the CausalImpact model may include a structural Bayesian time-series model to estimate causal effect of a designed intervention on a time series.

In 1040, the first difference value may be designated as the parameter difference of the parameter regarding the first user group and the second user group.

It should be noted that the above description is merely provided for the purposes of illustration, and not intended to limit the scope of the present disclosure. For persons having ordinary skills in the art, multiple variations and modifications may be made under the teachings of the present disclosure. For example, steps 1010 and 1020 may be merged into one step. As another example, steps 1010 and 1020 may be performed simultaneously or in any order. However, those variations and modifications do not depart from the scope of the present disclosure.

Figure 11:
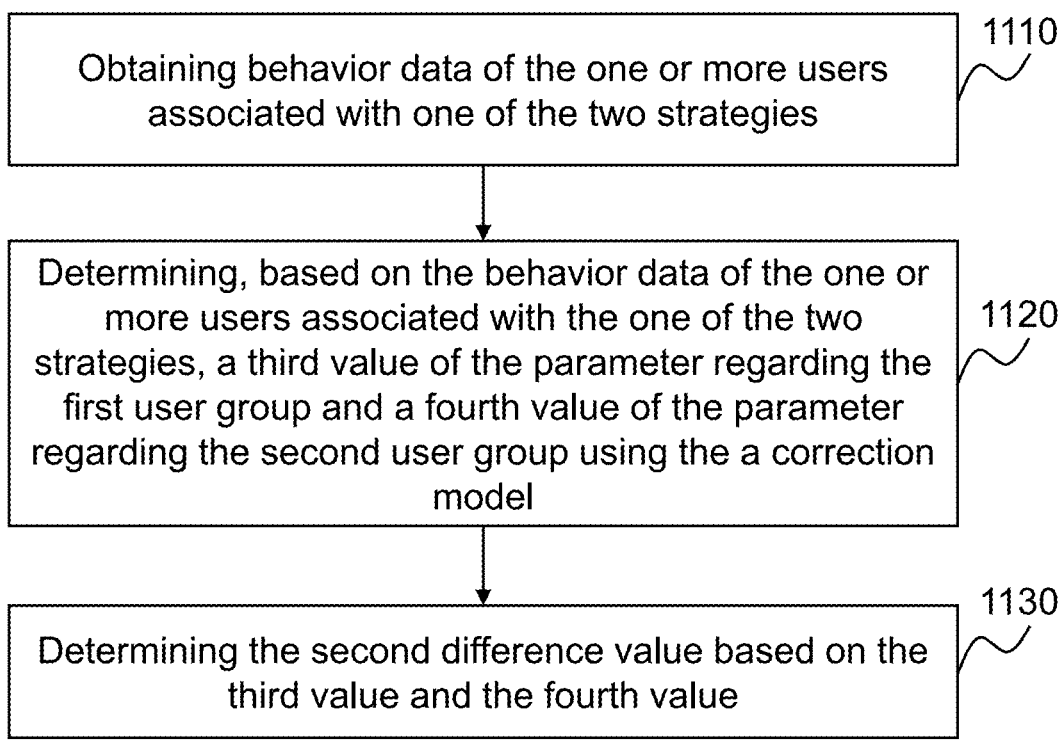
FIG. 11 is a flow chart illustrating an exemplary process for determining a second difference value according to some embodiments of the present disclosure.

FIG. 11 is a flow chart illustrating an exemplary process 1100 for determining a second difference value according to some embodiments of the present disclosure. In some embodiments, the process 1100 may be implemented in the strategy evaluation system 100. For example, the process 1100 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, the operations in the process 1100 may be performed by the determination unit 520.

In 1110, behavior data of the one or more users associated with one of the two strategies may be obtained. In some embodiments, the behavior data of the one or more users may be obtained from the user logs of the one or more users. In some embodiments, the operation for obtaining behavior data of the one or more users may be the same as or similar to the operations in 630. The one or more users may correspond to a same strategy. For example, the one or more users may correspond to a strategy of multiplying the price of a service by a coefficient 1 at peak hours (e.g., 8:00-9:00, 17:00-18:00, etc.).

In 1120, a third value of the parameter regarding the first user group and a fourth value of the parameter regarding the second user group may be determined based on the behavior data of the one or more users associated with the one of the two strategies using a correction model. As used herein, the correction model (e.g., the A/A testing model) may be configured to correct systematic errors of the optimization model. In some embodiments, the correction model may be the same as or similar to the optimization model except that the correction model associates the first user group and the second user group with a same strategy. For example, in an A/A testing process, the first user group and the second user group may correspond to the first strategy or the second strategy.

In 1130, the second difference value may be determined based on the third values and the fourth values. In some embodiments, the second difference value may be a difference between the third value and the fourth value. For example, the determination unit 520 may determine the second difference value by subtracting the third value (or the fourth value) from the fourth value (or the third value). In some embodiments, if the second difference value is 0, it may indicate that there is no systematic errors in the optimization model.

In some embodiments, the determination unit 520 may determine the reliability level of the second difference value based on a comparison of the P value with a significance value. More descriptions of the determination of the P value may be found elsewhere in the present disclosure (e.g., FIG. 13 and the descriptions thereof). In some embodiments, if the P value is not greater than the significance value (e.g., $P \leq 0.05$), it may indicate that the parameter difference of the parameter regarding the first user group and the second user group relating to the correction model is reliable. In this case, the determination unit 520 may stop using the optimization model, and design a new optimization model. If the p value is greater than the significance value (e.g., $P > 0.05$), it may indicate that the parameter difference of the parameter regarding the first user group and the second user group relating to the correction model is not reliable, i.e., the parameter difference is not significant. In this case, the determination unit 520 may correct the optimization model using the correction model.

It should be noted that the above description is merely provided for the purposes of illustration, and not intended to limit the scope of the present disclosure. For persons having ordinary skills in the art, multiple variations and modifications may be made under the teachings of the present disclosure. For example, when determining the optimal strategy, the process 1100 may be performed before the process 600, or the process 1100 and the process 600 may be performed at the same time. However, those variations and modifications do not depart from the scope of the present disclosure.

Figure 12:
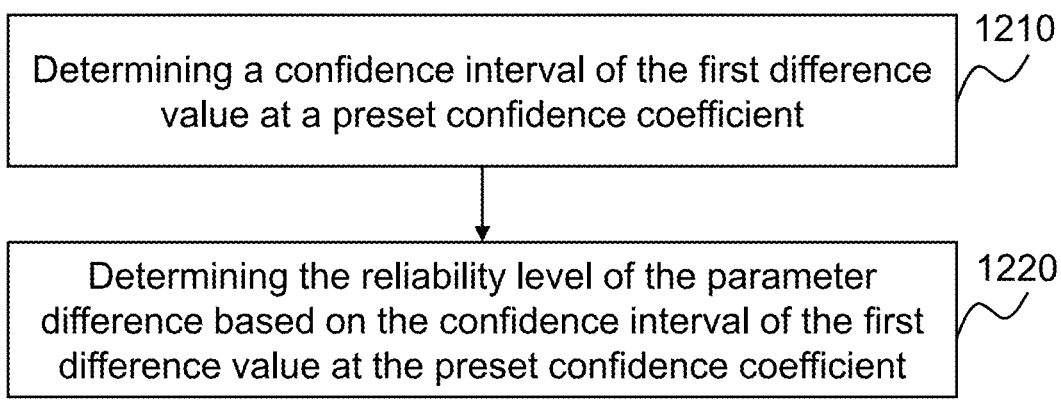
FIG. 12 is a flow chart illustrating an exemplary process for determining a reliability level of the parameter difference based in a confidence interval according to some embodiments of the present disclosure.

FIG. 12 is a flow chart illustrating an exemplary process 1200 for determining a reliability level of the parameter difference according to some embodiments of the present disclosure. In some embodiments, the process 1200 may be implemented in the strategy evaluation system 100. For example, the process 1200 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, the operations in the process 1200 may be performed by the determination unit 520.

In 1201, a confidence interval of the first difference value at a preset confidence coefficient may be determined. The confidence interval of the first difference value at the preset confidence coefficient may refer to that the probability that the first difference value falls in the confidence interval is associated with the preset confidence coefficient. Merely for illustration purpose, the confidence interval (e.g., (50, 90)) at the preset confidence coefficient (e.g., 95%) may refer to the probability that the first difference value falls in the range of (50, 90) is 95%.

In some embodiments, the parameter may be an average number of service orders. Merely for illustration purposes, the number of service orders for each user in the first user group may be represented as $(x_1, x_2, x_3, \ldots, x_{n_1})$, where $n_1$ refers to the number of users in the first user group, $x_i$ refers to the number of service orders for an i-th user in the first user group. In some embodiments, the average number of service orders in the first user group may be determined according to Equation (1):

$$m_1 = \sum_{i=1}^{n_1} \frac{x_i}{n_1}, \tag{1}$$

where $m_1$ refers to the average number of service orders in the first user group, $x_i$ refers to the number of service orders for an i-th user in the first user group, and $n_1$ refers to the number of users in the first user group. A variance of the number of service orders in the first user group may be determined according to Equation (2):

$$\sigma_1 = \sum_{i=1}^{n_1} \frac{(x_i - m_i)^2}{(n_1 - 1)}, \quad (2)$$

where σ1 refers to the variance of the number of service orders in the first user group, $x_i$ refers to the number of service orders for an i-th user in the first user group, $m_1$ refers to the average number of service orders in the first user group, and $n_1$ refers to the number of users in the first user group. Similarly, it is assumed that the number of service orders for each user in the second user group may be represented as $(y_1, y_2, y_3, \ldots, y_{n2})$, where $n_2$ refers to the number of users in the second user group, $y_i$ refers to the number of service orders for an i-th user in the second user group. In some embodiments, the average number of service orders in the first user group may be determined according to Equation (3):

$$m_2 = \sum_{i=1}^{n_2} \frac{y_i}{n_2}, \quad (3)$$

where $m_2$ refers to the average number of service orders in the second user group, $y_i$ refers to the number of service orders for an i-th user in the first user group, and $n_2$ refers to the number of users in the second user group. A variance of the number of service orders in the second user group may be determined according to Equation (4):

$$\sigma_2 = \sum_{i=1}^{n_2} \frac{(y_i - m_2)^2}{(n_2 - 1)}, \quad (4)$$

where $\sigma_2$ refers to the variance of the number of service orders in the second user group, yi refers to the number of service orders for an i-th user in the second user group, $m_2$ refers to the average number of service orders in the second user group, and $n_2$ refers to the number of users in the second user group. In some embodiments, the first difference value of the parameter regarding the first user group and the second user group may be determined according to Equation (5):

$$D_1 = m_2 - m_1 \pm \Delta u \quad (5)$$

where $D_1$ refers to the first difference value, $m_1$ refers to the average number of service orders in the first user group, $m_2$ refers to the average number of service orders in the second user group, and $\Delta u$ refers to the second difference value (i.e., the systematic errors of the optimization model).

In some embodiments, a start point of the confidence interval may be determined according to Equation (6):

$$C_1 = D_1 - Z_{1-\frac{\alpha}{2}} * \sqrt{\frac{\sigma_1}{n_1} + \frac{\sigma_2}{n_2}}, \quad (6)$$

where $C_1$ refers to the start point of the confidence interval, $D_1$ refers to the first difference value, $\sigma_1$ refers to the variance of the number of service orders in the first user group, $\sigma_2$ refers to the variance of the number of service orders in the second user group, $n_1$ refers to the number of users in the first user group, $n_2$ refers to the number of users in the second user group, α refers to a significance value, 1−α refers to the confidence coefficient, and $$Z_{1-\frac{\alpha}{2}}$$

may be determined based on a distribution of the parameter in math. In some embodiments, the obtaining unit 420 may obtain the distribution of the parameter by consulting a distribution table. In some embodiments, the distribution of the parameter in math may be determined according to the type of the parameter. For example, if the parameter is an average number of service orders, the distribution of the parameter in math may be a Bernoulli distribution. As another example, if the parameter is expense of users, the distribution of the parameter in math may be a normal distribution. An end point of the confidence interval may be determined according to Equation (7):

$$C_2 = D_1 + Z_{1-\frac{\alpha}{2}} * \sqrt{\frac{\sigma_1}{n_1} + \frac{\sigma_2}{n_2}}, \quad (7)$$

where $C_2$ refers to the end point of the confidence interval, $D_1$ refers to the first difference value, $\sigma_1$ refers to the variance of the number of service orders in the first user group, $\sigma_2$ refers to the variance of the number of service orders in the second user group, $n_1$ refers to the number of users in the first user group, $n_2$ refers to the number of users in the second user group, a refers to the significance value, 1−α refers to the confidence coefficient, and $$Z_{1-\frac{\alpha}{2}}$$

may be determined based on the distribution of the parameter in math. Accordingly, the confidence interval of the difference value at the present confidence coefficient may be determined according to Equation (8):

$$\left( D1 - Z_{1-\frac{\alpha}{2}} * \sqrt{\frac{\sigma 1}{n1} + \frac{\sigma 2}{n2}}, D1 + Z_{1-\frac{\alpha}{2}} * \sqrt{\frac{\sigma 1}{n1} + \frac{\sigma 2}{n2}} \right). \quad (8)$$

In 1220, the reliability level of the parameter difference may be determined based on the confidence interval of the difference value at the preset confidence coefficient. In some embodiments, if the confidence interval includes 0, it may indicate that the parameter difference of the parameter (e.g., the average number of service orders) regarding the first user group and the second user group is not significant. If the confidence interval does not include 0, and both the start point and the end point of the confidence interval are greater than 0, it may indicate that the average number of service orders in the second user group associated with the second strategy is greater than the number of service orders in the first user group associated with the first strategy. If the confidence interval does not include 0, and both the start point and the end point of the confidence interval are less than 0, it may indicate that the average number of service orders in the second user group associated with the second strategy is less than the average number of service orders in the first user group associated with the first strategy.

Figure 13:
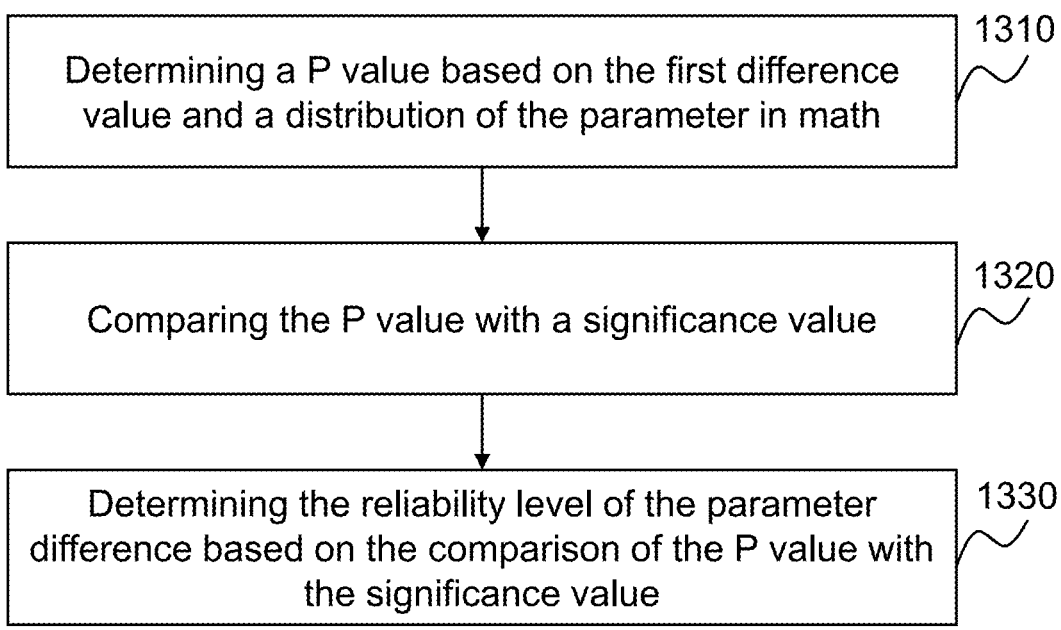
FIG. 13 is a flow chart illustrating an exemplary process for determining a reliability level of the parameter difference based on a probability value according to some embodiments of the present disclosure.

FIG. 13 is a flow chart illustrating an exemplary process 1300 for determining a reliability level of the parameter difference according to some embodiments of the present disclosure. In some embodiments, the process 1300 may be implemented in the strategy evaluation system 100. For example, the process 1300 may be stored in the storage device 130 and/or the storage (e.g., the computer readable medium 230) as a form of instructions, and invoked and/or executed by the server 110 (e.g., the processing engine 112 in the server 110, or the processor 210 of the processing engine 112 in the server 110). In some embodiments, the operations in the process 1300 may be performed by the determination unit 520.

In 1310, a P value may be determined based on the first difference value and a distribution of the parameter in math. In some embodiments, the parameter may be an average number of service orders. Merely for illustration purposes, a statistics value may be determined according to Equation (9):

$$t = D_1 \bigg/ \sqrt{\frac{\sigma 1}{n1} + \frac{\sigma 2}{n2}}, \qquad (9)$$

where t refers to the statistics value, $D_1$ refers to the first difference value (e.g., determined according to Equation (5)), $\sigma_1$ refers to the variance of the number of service orders in the first user group (e.g., determined according to Equation (2)), $\sigma_2$ refers to the variance of the number of service orders in the second user group (e.g., determined according to Equation (4)), n1 refers to the number of users in the first user group; n2 refers to the number of users in the second user group. The statistics value may be, for example, standardized value that is determined based on obtained data (e.g., the behavior data of the users) during the hypothesis test. The P value may be determined according to Equation (10):

$$P = 2 \cdot p(z > |t|) \qquad (10)$$

where P refers to the P value; $p(z > \sqrt[3]{t|})$ refers to an area enclosed by the normal distribution curve and the abscissa in a range where the average number of service orders is greater than t, and t refers to the statistics value.

In 1320, the P value may be compared with a significance value. In some embodiments, the significance value may be set manually by a user, or be determined by one or more components of the strategic evaluation system 100 according to default settings. For example, the significance value may be 0.05.

In 1330, the reliability level of the parameter difference may be determined based on the comparison of the P value with the significance value. In some embodiments, a null hypothesis and an alternative hypothesis may be proposed by a user, or one or more components of the strategic evaluation system 100 according to default settings. For example, the null hypothesis may be that the first value of the parameter regarding the first user group is the same as the second value of the parameter regarding the second user group (i.e., the first difference value is 0). The alternative hypothesis may be that the first value of the parameter regarding the first user group is different from the second value of the parameter regarding the second user group (i.e., the first difference value is not 0). In some embodiments, the null hypothesis and the alternative hypothesis may be interchangeable. In some embodiments, if the P value is not greater than the significance value (e.g., P≤0.05), the null hypothesis may be rejected, which indicates that the first value of the parameter regarding the first user group is different from the second value of the parameter regarding the second user group. In this case, a smaller P value may correspond to a higher reliability level of the parameter difference. If the P value is greater than the significance value (e.g., P>0.05), the null hypothesis may be accepted, which indicates that, the first value of the parameter regarding the first user group is the same as the second value of the parameter regarding the second user group. In this case, the parameter difference of the parameter may not be reliable.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

We claim:

1. A system for providing a car hailing service, comprising:
    at least one storage medium storing a set of instructions; and
    processing circuits in communication with the at least one storage medium, wherein when executing the set of instructions, the processing circuits are directed to:
        classify one or more users into a first user group and a second user group using an optimization model, wherein the first user group and the second user group correspond to two transport service adjustments, respectively, the two transport service adjustments relating to the service time, wherein to classify the one or more users into the first user group and the second user croup, the processing circuits are directed to operate the optimization model to:
            generate a random number for each of the one or more users:
            determine whether the random number for each of the one or more users is greater than a threshold; and
            in response to the random number for a user being greater than the threshold,
                classify the user into the first user group;
        obtain behavior data from terminals of the one or more users in the first user group and the second user group,
        determine, based on the behavior data of the one or more users, a first value of a parameter regarding the first user group and a second value of the parameter regarding the second user group using the optimization model, wherein the parameter represents at least one of the number of service orders, an order acceptance rate, or an average response time of the service orders; and
        determine an optimal transport service adjustment based on the first value and the second value.

2. The system of claim 1, wherein the processing circuits are directed to initiate the optimization model to classify the one or more users into the first user group and the second user group when the system obtains service requests from the one or more users.

3. The system of claim 1, the processing circuits are further directed to:
    in response to the random number for a user being not greater than the threshold, classify the user into the second user group.

4. The system of claim 1, wherein the parameter includes a parameter in multiple dimensions.

5. The system of claim 4, wherein the parameter in multiple dimensions relates to order information of on-demand services.

6. The system of claim 5, wherein the multiple dimensions include a gender, a city, and/or an operation system of the terminal of the one or more users.

7. The system of claim 1, wherein to obtain behavior data from the terminals of the one or more users in the first user group and the second user group, the processing circuits are directed to:
    obtain user logs including the behavior data from terminals of the one or more users using a Hadoop Distribute File System.

8. The system of claim 1, wherein the processing circuits are further directed to:
    determine a parameter difference of the parameter regarding the first user group and the second user group;
    determine a reliability level of the parameter difference; and
    adjust the optimization model based on the parameter difference and the reliability level of the parameter difference.

9. The system of claim 8, wherein to determine the parameter difference of the parameter regarding the first user group and the second user group, the processing circuits are directed to:
    determine a first difference value of the parameter regarding the first user group and the second user group.

10. The system of claim 9, wherein to determine the first difference value of the parameter regarding the first user group and the second user group; the processing circuits are directed to:

determine a second difference value;
determine a third difference value; and
determine the first difference value based on the second difference value and the third difference value.

11. The system of claim 10, wherein to determine the second difference value, the processing circuits are directed to:
obtain behavior data of the one or more users associated with one of the two transport service adjustments;
determine, based on the behavior data of the one or more users associated with the one of the two transport service adjustments, a third value of the parameter regarding the first user group and a fourth value of the parameter regarding the second user group using a correction model; and
determine the second difference value based on the third value and the fourth value.

12. The system of claim 10, wherein to determine the third difference value, the processing circuits are directed to:
determine the third difference value based on the first value and the second value.

13. The system of claim 8, wherein to determine the reliability level of the parameter difference, the processing circuits are directed to:
determine, at a preset confidence coefficient, a confidence interval of the first difference value.

14. The system of claim 8, wherein to determine the reliability level of the parameter difference, the processing circuits are directed to:
determine a P value based on the first difference value;
compare the P value with a significance value; and
determine the reliability level of the parameter difference based on the comparison of the P value with the significance value.

15. A method for providing a car hailing service implemented on a computing device having processing circuits and one or more storage devices, the method comprising:
classifying one or more users into a first user group and a second user group using an optimization model, wherein the first user group and the second user group correspond to two transport service adjustments, respectively, the two transport service adjustments relating to the service time, wherein classifying the one or more users into the first user group and the second user group comprises:
generating a random number for each of the one or more users;
determining whether the random number for each of the one or more users is greater than a threshold;
in response to the random number for a user being greater than the threshold,
classifying the user into the first user group; and
in response to the random number for a user being not greater than the threshold,
classifying the user into the second user group;
obtaining behavior data from terminals of the one or more users in the first user group and the second user group;
determining, based on the behavior data of the one or more users, a first value of a parameter regarding the first user group and a second value of the parameter regarding the second user group using the optimization model, wherein the parameter represents at least one of the number of service orders, an order acceptance rate, or an average response time of the service orders; and
determining an optimal transport service adjustment based on the first value and the second value.

16. The method of claim 15, wherein the parameter includes a parameter in multiple dimensions.

17. The method of claim 15, further comprising:
determining a parameter difference of the parameter regarding the first user group and the second user group;
determining a reliability level of the parameter difference; and
adjusting the optimization model based on the parameter difference and the reliability level of the parameter difference.

18. A non-transitory computer readable medium, comprising at least one set of instructions for providing a car hailing service, wherein when executed by processing circuits of a computing device, the at least one set of instructions causes the computing device to perform a method, the method comprising:
classifying one or more users into a first user group and a second user group using an optimization model, wherein the first user group and the second user group correspond to two transport service adjustments, respectively, the two transport service adjustments relating to the service time, wherein classifying the one or more users into the first user group and the second user group comprises:
generating a random number for each of the one or more users;
determining whether the random number for each of the one or more users is greater than a threshold;
in response to the random number for a user being greater than the threshold,
classifying the user into the first user group; and
in response to the random number for a user being not greater than the threshold,
classifying the user into the second user group;
obtaining behavior data from terminals of the one or more users in the first user group and the second user group;
determining, based on the behavior data of the one or more users, a first value of a parameter in multiple dimension regarding the first user group and a second value of the parameter in multiple dimension regarding the second user group using the optimization model, wherein the parameter represents at least one of the number of service orders, an order acceptance rate, or an average response time of the service orders; and
determining an optimal transport service adjustment based on the first value and the second value.

* * * * *